US012802913B2

(12) United States Patent
Kakiuchi

(10) Patent No.: US 12,802,913 B2
(45) Date of Patent: Nov. 17, 2026

(54) ELECTROMAGNETIC RELAY

(71) Applicant: OMRON Corporation, Kyoto (JP)

(72) Inventor: Tatsuki Kakiuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 145 days.

(21) Appl. No.: 19/056,748

(22) Filed: Feb. 19, 2025

(65) Prior Publication Data

US 2025/0308821 A1 Oct. 2, 2025

(30) Foreign Application Priority Data

Mar. 28, 2024 (JP) ................................ 2024-054111

(51) Int. Cl.
*H01H 50/02* (2006.01)
*H01H 51/29* (2006.01)

(52) U.S. Cl.
CPC ............ *H01H 50/02* (2013.01); *H01H 51/29* (2013.01)

(58) Field of Classification Search
CPC ........ H01H 50/02; H01H 51/29; H01H 50/12; H01H 50/54
See application file for complete search history.

(56) References Cited

U.S. PATENT DOCUMENTS

| | | | | |
|---|---|---|---|---|
| 3,925,742 A * | 12/1975 | Muench | ................. | H01H 50/54 335/170 |
| 6,850,421 B2 * | 2/2005 | Boyd | ................. | H01H 85/2045 361/833 |
| 2022/0122790 A1 | 4/2022 | Kawashima et al. | | |
| 2023/0008722 A1 * | 1/2023 | Kawaguchi | .......... | H01H 50/042 |

FOREIGN PATENT DOCUMENTS

| | | | | | |
|---|---|---|---|---|---|
| CN | 1274963 A * | 11/2000 | ............. | H01H 50/02 |
| DE | 19732695 A1 * | 8/1998 | ............. | H01H 50/54 |
| EP | 3806128 A1 * | 4/2021 | ............. | H01H 50/14 |
| JP | 2021-114450 A | 8/2021 | | |
| WO | WO-2024225195 A1 * | 10/2024 | ............. | H01H 50/54 |

* cited by examiner

*Primary Examiner* — Mohamad A Musleh
(74) *Attorney, Agent, or Firm* — SHINJYU GLOBAL IP

(57) ABSTRACT

An electromagnetic relay includes a contact unit, a case, and a cover. The case includes an internal space, a side wall, a first main opening, a first engaged portion, and a second engaged portion. The contact unit is disposed in the internal space. The cover includes a cover body, a first engaging portion, and a second engaging portion. The first engaging portion is connected to the cover body. The second engaging portion is connected to the cover body at a position different from that of the first engaging portion. The cover is held in either a normal position or a pressure-relief position. In the normal position, the first engaging portion engages with the first engaged portion, and the cover body closes the first main opening. In the pressure-relief position, the second engaging portion engages with the second engaged portion, and the cover body opens the first main opening.

15 Claims, 27 Drawing Sheets

ELECTROMAGNETIC RELAY

CROSS-REFERENCE TO RELATED APPLICATION

This application claims priority to Japanese Patent Application No. 2024-54111, filed Mar. 28, 2024. The contents of that application are incorporated by reference herein in their entirety.

FIELD

The claimed invention relates to an electromagnetic relay.

BACKGROUND

In an electromagnetic relay, when a large current flows through the contacts, an arc may occur when the contacts separate. The energy of this arc causes an increase in internal pressure in the case of the electromagnetic relay. For example, JP 2021-114450A discloses an electromagnetic relay having a structure for preventing the case cover from being blown off due to an increase in internal pressure. In this electromagnetic relay, the cover includes a cover body and an engagement leg portion. The engagement leg portion extends from the cover body. The engagement leg portion includes a first engagement hook and a second engagement hook. The first engagement hook and the second engagement hook are arranged vertically on the engagement leg portion, and the second engagement hook is arranged below the first engagement hook. The case includes a hook-engaging portion with which the first engagement hook and the second engagement hook engage.

In the above-described electromagnetic relay, in a normal state where no arc is generated, the first engagement hook is engaged with the hook-engaging portion, thereby attaching the cover to the case. When the internal pressure of the case increases due to an arc, the engagement leg portion elastically deforms, causing the first engagement hook to disengage from the hook-engaging portion. This causes the cover to lift off the case, thereby forming a gap between the cover and the case. The air inside the case is released to the outside through this gap, reducing the internal pressure of the case. Furthermore, as the cover rises, the second engagement hook engages with the hook-engaging portion, thereby preventing the cover from being blown off.

SUMMARY

In the electromagnetic relay as described above, the first engagement hook is required to have a degree of rigidity that allows it to easily come off the hook-engaging portion with a small load when the internal pressure increases. On the other hand, the second engagement hook is required to have rigidity capable of withstanding a high load so as not to come off the hook-engaging portion when the internal pressure increases. However, in the above-mentioned electromagnetic relay, the first engagement hook and the second engagement hook are provided on the same engagement leg portion. Therefore, in designing an electromagnetic relay, it is difficult to adjust the rigidity of the first engagement hook and the rigidity of the second engagement hook as described above. An object of the claimed invention is to facilitate adjustment of the degree of engagement, including the rigidity of an engaging portion, in an electromagnetic relay to prevent a cover from being blown off when an arc occurs.

An embodiment of an electromagnetic relay in accordance with the claimed invention includes a contact unit, a case, and a cover. The contact unit includes a fixed contact and a movable contact. The case includes an internal space, a side wall, a first main opening, a first engaged portion, and a second engaged portion. The contact unit is disposed in the internal space. The side wall encloses the internal space. The first main opening provides communication between the internal space and the outside. The cover is attached to the case. The cover includes a cover body, a first engaging portion, and a second engaging portion. The first engaging portion is connected to the cover body. The second engaging portion is connected to the cover body at a position different from that of the first engaging portion. The cover is held in either a normal position or a pressure-relief position. In the normal position, the first engaging portion engages with the first engaged portion, and the cover body closes the first main opening. In the pressure-relief position, the second engaging portion engages with the second engaged portion, and the cover body opens the first main opening.

In the embodiment of the electromagnetic relay, when no arc is generated, the cover is held in the normal position. When the cover is in the normal position, the first engaging portion engages with the first engaged portion, and the cover body closes the first main opening. When the internal pressure of the case increases due to the arc, the internal pressure causes the first engaging portion to disengage from the first engaged portion and the cover to lift up from the case. The second engaging portion engages with the second engaged portion, thereby holding the cover in the pressure-relief position. This prevents the cover from being blown off. When the cover is in the pressure-relief position, the cover body opens the first main opening. This allows the air inside the case to be released to the outside, thereby reducing the internal pressure inside the case. Furthermore, in the embodiment of the electromagnetic relay, the second engaging portion is connected to the cover body at a position different from that of the first engaging portion. Therefore, it is easy to adjust the degree of engagement, including the rigidity of the first engaging portion and the second engaging portion.

DETAILED DESCRIPTION

Figure 1:
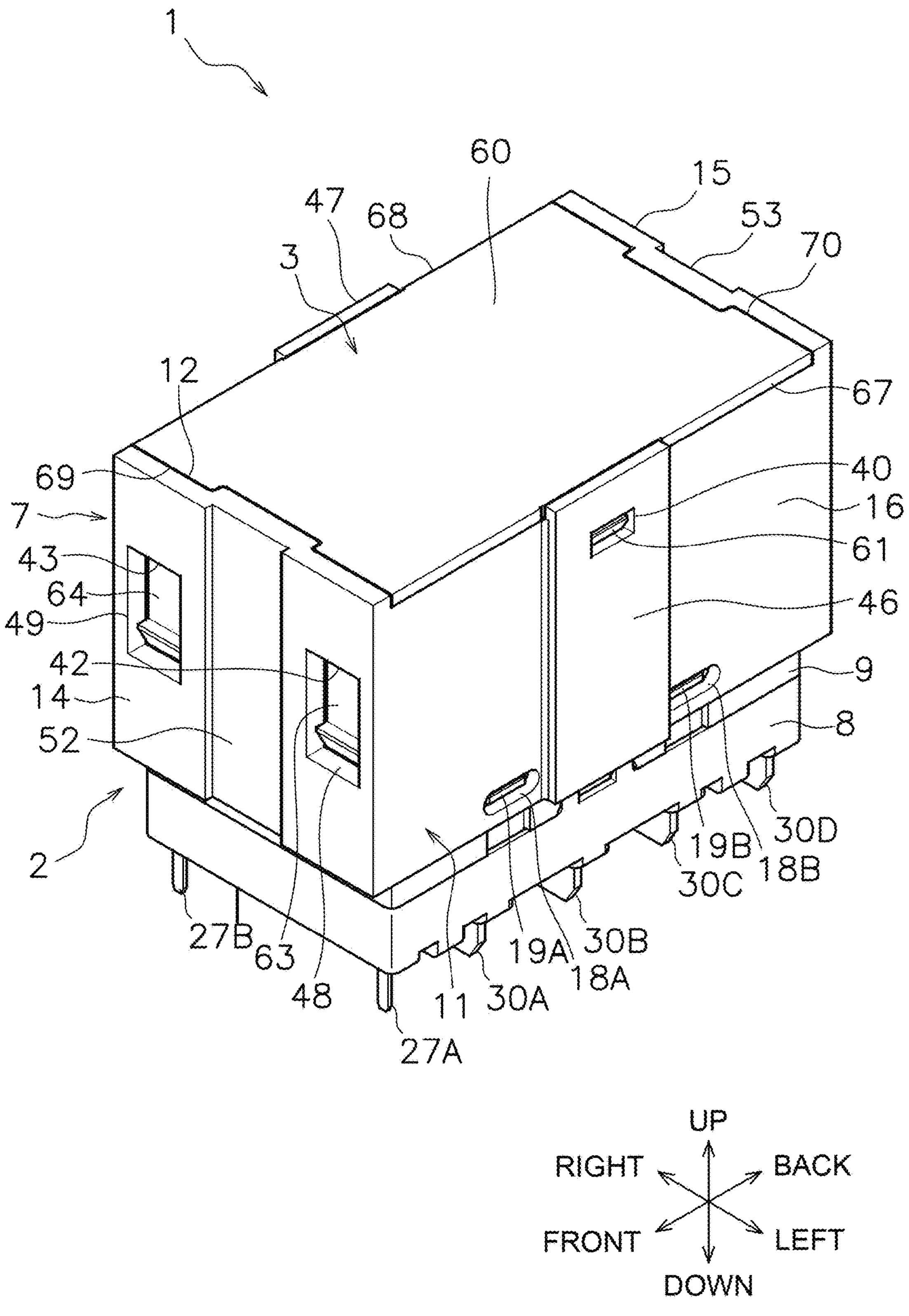
FIG. 1 is a perspective view of an embodiment of an electromagnetic relay in accordance with the claimed invention.
Figure 2:
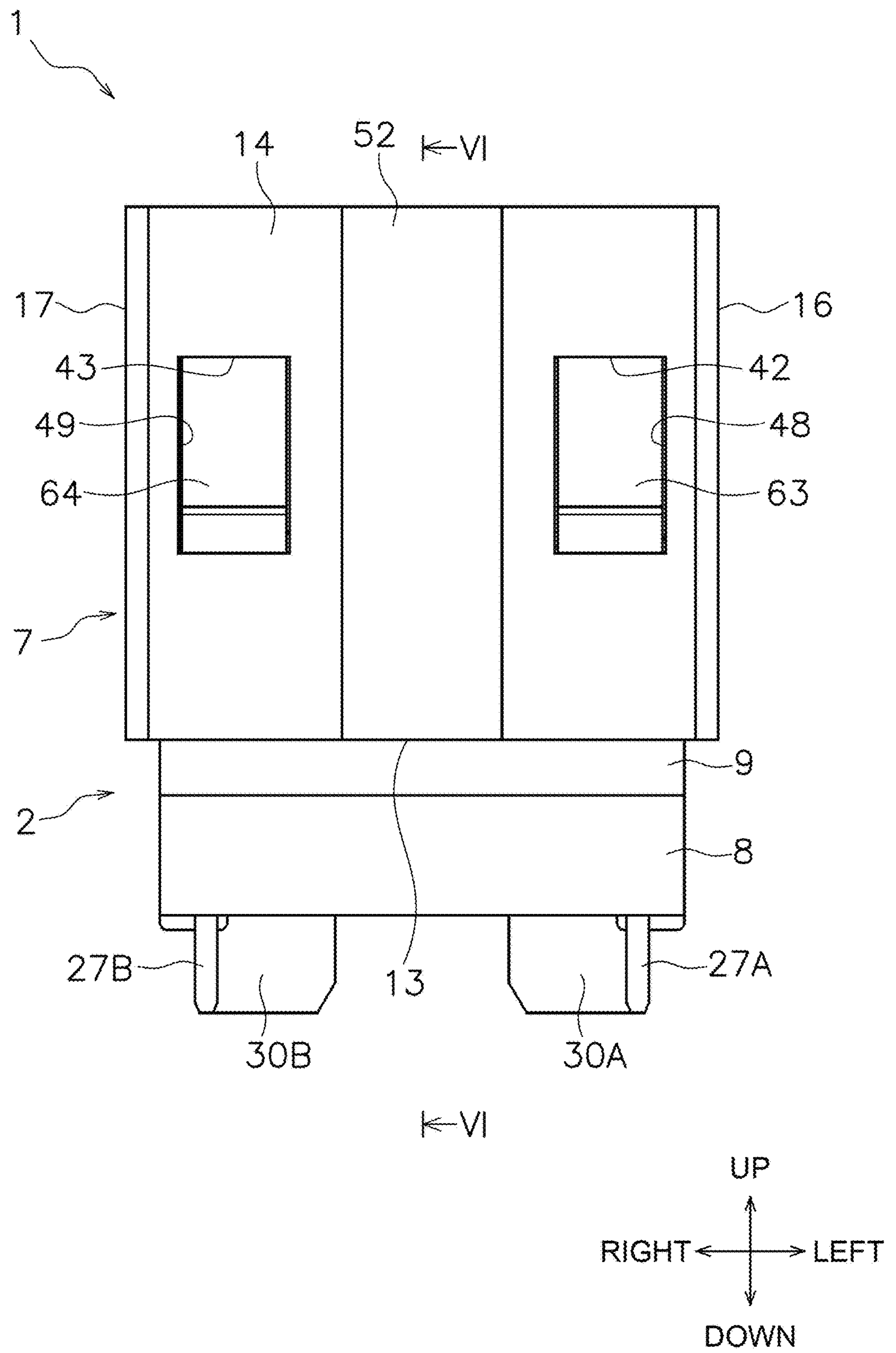
FIG. 2 is a front view of the electromagnetic relay.
Figure 3:
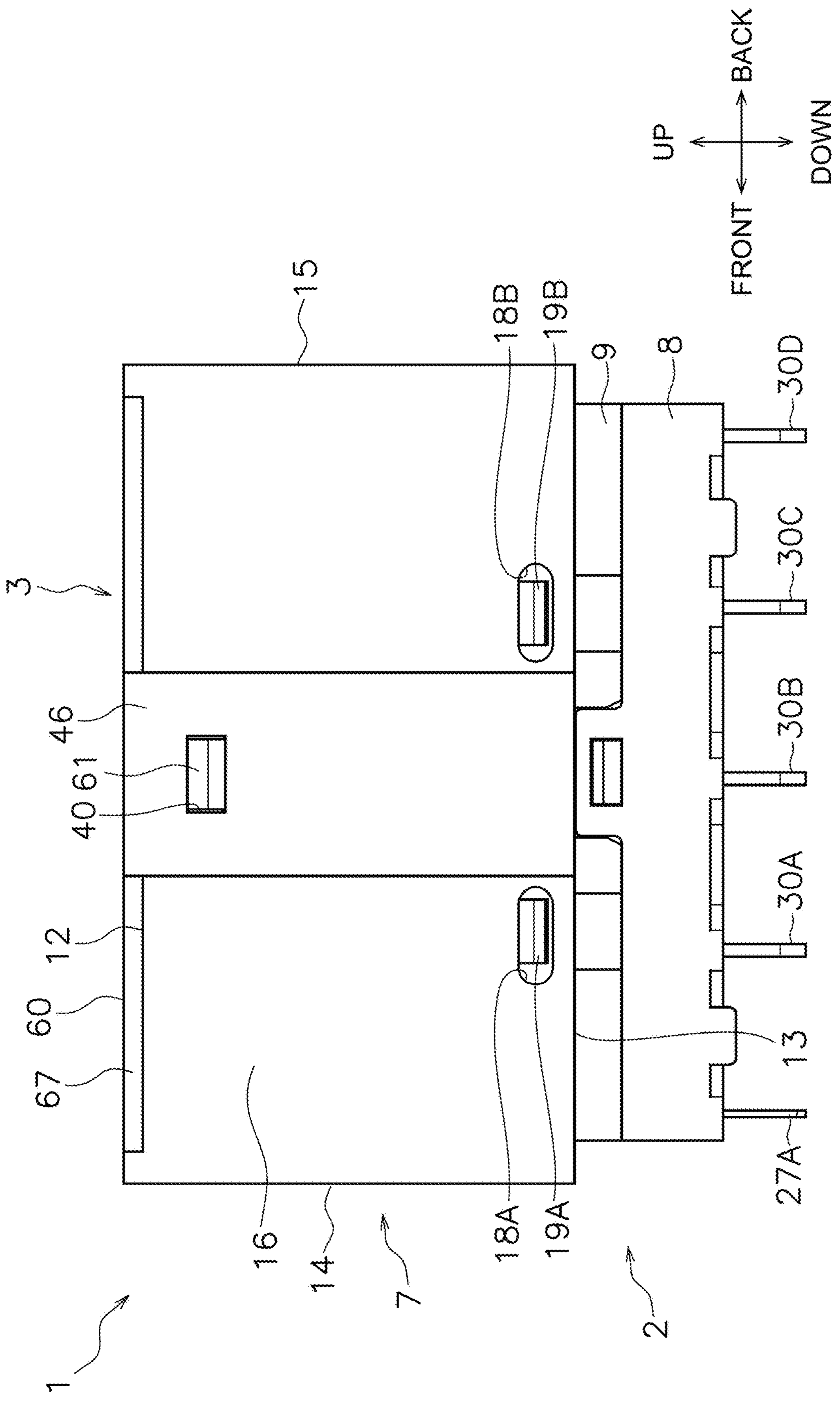
FIG. 3 is a side view of the electromagnetic relay.
Figure 4:
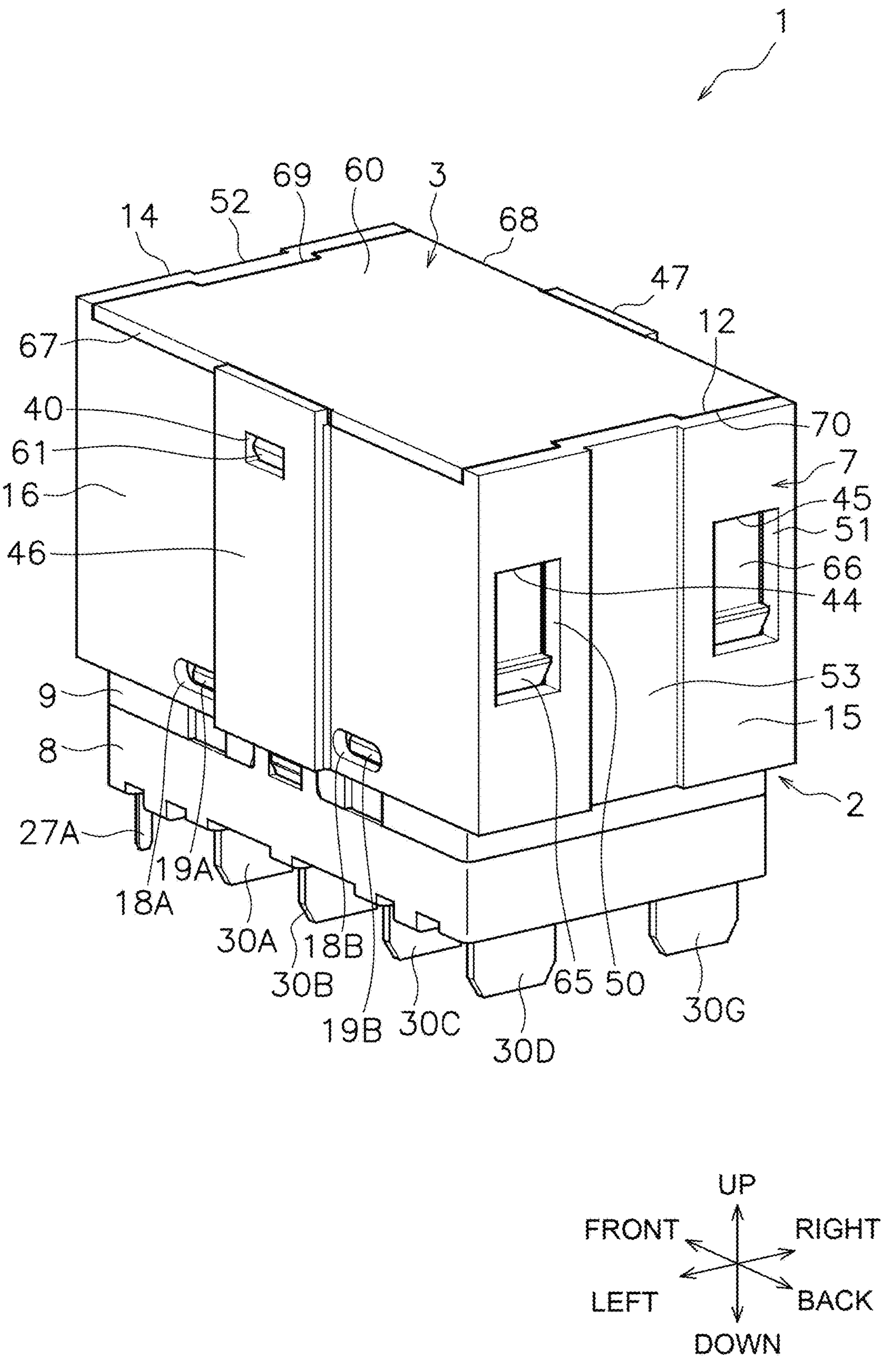
FIG. 4 is a perspective view of the electromagnetic relay.
Figure 5:
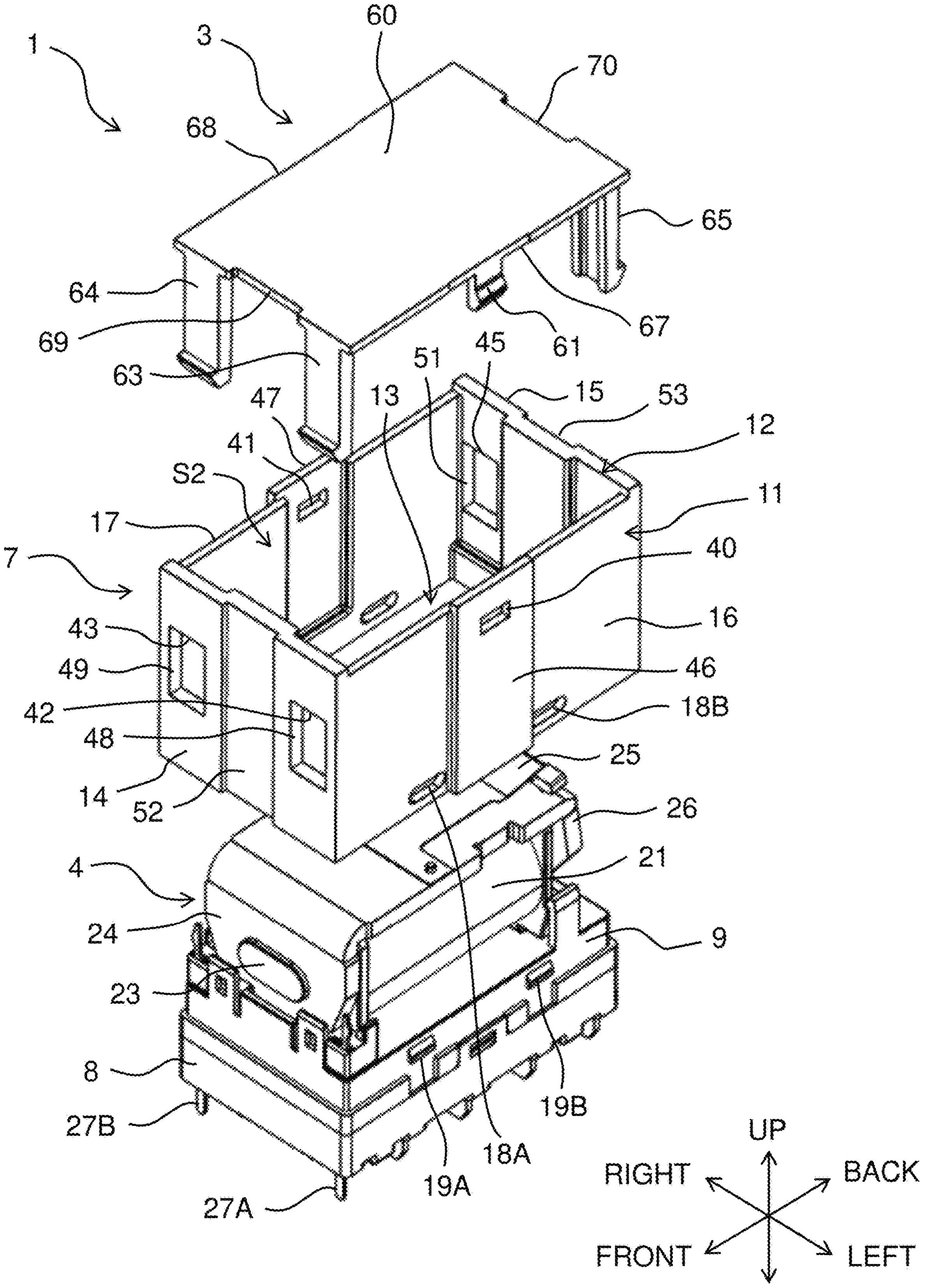
FIG. 5 is an exploded perspective view of the electromagnetic relay.
Figure 6:
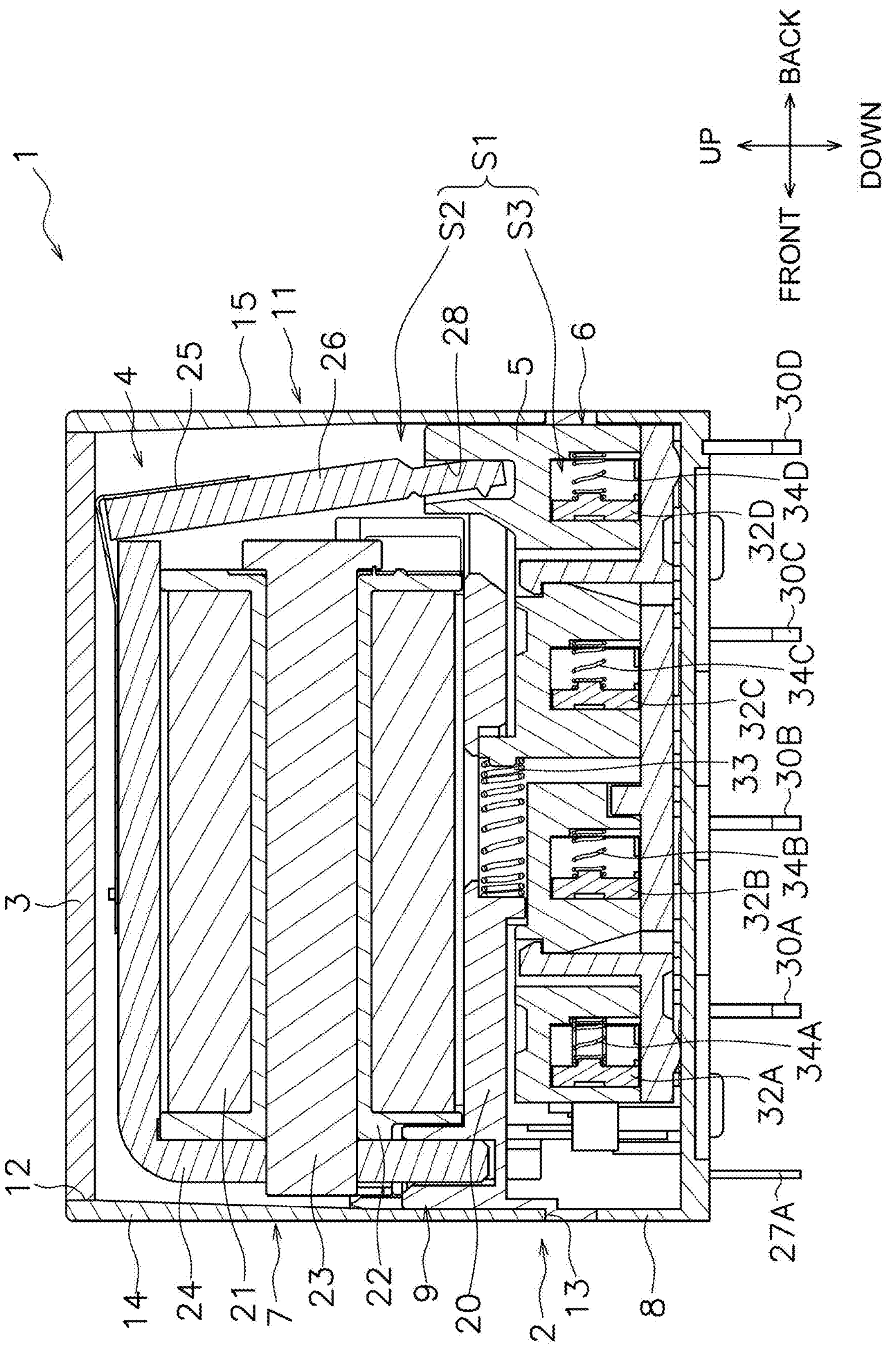
FIG. 6 is a cross-sectional view of the electromagnetic relay taken along line VI-VI of FIG. 2.

Hereinafter, an embodiment of an electromagnetic relay in accordance with the claimed invention will be described with reference to the drawings. FIG. 1 is a perspective view of an electromagnetic relay 1. FIG. 2 is a front view of the electromagnetic relay 1. FIG. 3 is a side view of the electromagnetic relay 1. FIG. 4 is a perspective view of the electromagnetic relay 1. FIG. 5 is an exploded perspective view of the electromagnetic relay 1. FIG. 6 is a cross-sectional view of the electromagnetic relay 1 taken along the line VI-VI in FIG. 2. As shown in FIGS. 1 to 6, the electromagnetic relay 1 includes a case 2, a cover 3, a drive unit 4, a movable member 5, and a contact unit 6.

The cover 3 is a separate body from the case 2. The cover 3 is attached to the case 2. The cover 3 may be made of resin. The cover 3 has a substantially rectangular shape. In the following description, the direction in which the long sides of the cover 3 extend is defined as the front-rear direction. The direction in which the short sides of the cover 3 extend is defined as the left-right direction.

As shown in FIG. 6, the case 2 includes an internal space S1. The drive unit 4, the movable member 5, and the contact unit 6 are disposed within the internal space S1 of the case 2. The case 2 includes an upper case 7, a lower case 8, and an inner board 9. The upper case 7, the inner board 9, and the lower case 8 are separate bodies from one another. The upper case 7 is made of resin. The upper case 7 is attached to the inner board 9. The upper case 7 may be attached to the inner board 9 by, for example, a snap fit.

More specifically, as shown in FIG. 5, the upper case 7 has a substantially rectangular parallelepiped shape with openings at the top and bottom. The upper case 7 includes a first internal space S2, a side wall 11, a first main opening 12, and a second main opening 13. The side wall 11 surrounds the first internal space S2. The side wall 11 includes a front surface 14, a rear surface 15, a left side surface 16, and a right side surface 17. The length of the front surface 14 and the rear surface 15 in the left-right direction is shorter than the length of the left side surface 16 and the right side surface 17 in the front-rear direction. The first main opening 12 is provided in the top surface of the upper case 7. The second main opening 13 is provided in the lower surface of the upper case 7. The first main opening 12 and the second main opening 13 provide communication between the first internal space S2 and the outside of the upper case 7.

The left side surface 16 of the upper case 7 includes a pair of left mounting holes 18A and 18B. The inner board 9 includes a pair of left mounting claws 19A and 19B. The upper case 7 is attached to the inner board 9 by the pair of left mounting claws 19A and 19B engaging with the pair of left mounting holes 18A and 18B, respectively. Although not shown, a pair of right mounting holes are provided in the right side surface 17 of the upper case 7, and a pair of right mounting claws of the inner board 9 respectively engage with the pair of right mounting holes.

The lower case 8 is disposed below the upper case 7. The lower case 8 is made of an insulating material such as resin. The inner board 9 is disposed on the lower case 8. The inner board is attached to the lower case 8. The inner board 9 is disposed between the upper case 7 and the lower case 8. The inner board 9 is made of an insulating material such as resin. As shown in FIG. 6, the lower case 8 and the inner board 9 include a second internal space S3. The lower case 8 covers the second internal space S3 from below. The inner board 9 covers the second internal space S3 from above. The inner board 9 includes a partition wall 20. The partition wall 20 separates the first internal space S2 from the second internal space S3.

Figure 7:
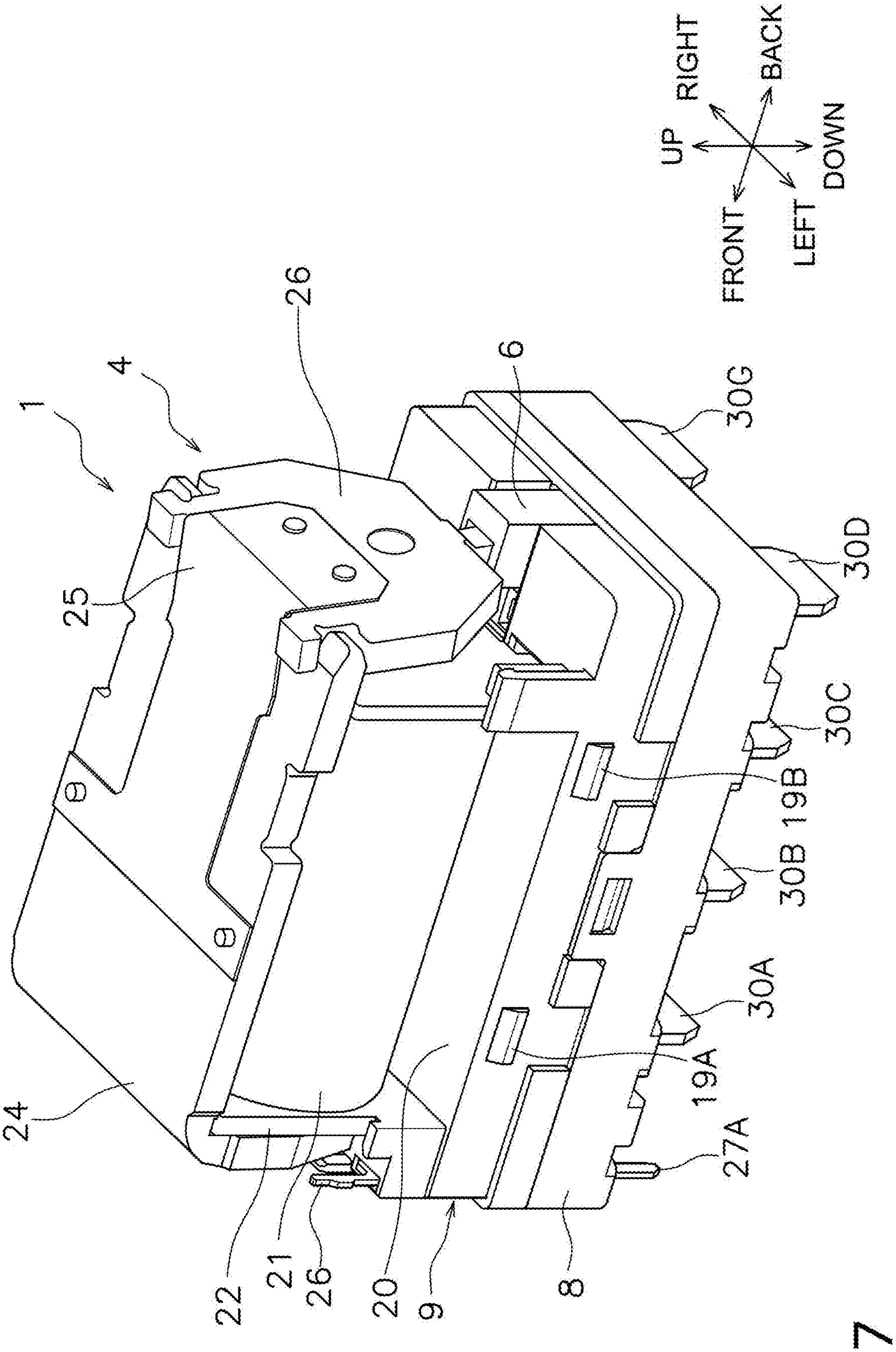
FIG. 7 is a perspective view of the electromagnetic relay with the upper case omitted.

As shown in FIG. 6, the drive unit 4 is disposed in the first internal space S2 of the upper case 7. FIG. 7 is a perspective view of the electromagnetic relay 1 with the upper case 7 omitted. As shown in FIGS. 6 and 7, the drive unit 4 includes a coil 21, a spool 22, an iron core 23, a yoke 24, a hinge spring 25, and an armature 26. The coil 21 is wound around a spool 22. The coil 21 is connected to coil terminals 27A and 27B. As shown in FIG. 5, the coil terminals 27A and 27B are supported by the lower case 8 and the inner board 9.

The iron core 23 is disposed within the spool 22. The iron core 23 extends in the front-rear direction. The yoke 24 has an L-shaped bend. The yoke 24 is disposed in front of and above the spool 22. The yoke 24 is connected to the iron core 23. The hinge spring 25 is connected to the yoke 24 and the armature 26. The armature 26 is supported rotatably about its upper end. As the armature 26 rotates about its upper end, the lower end of the armature 26 moves back and forth. The armature 26 is disposed behind the iron core 23. The hinge spring 25 biases the armature 26 in a direction away from the iron core 23. That is, the hinge spring 25 biases the armature 26 rearward.

Figure 8:
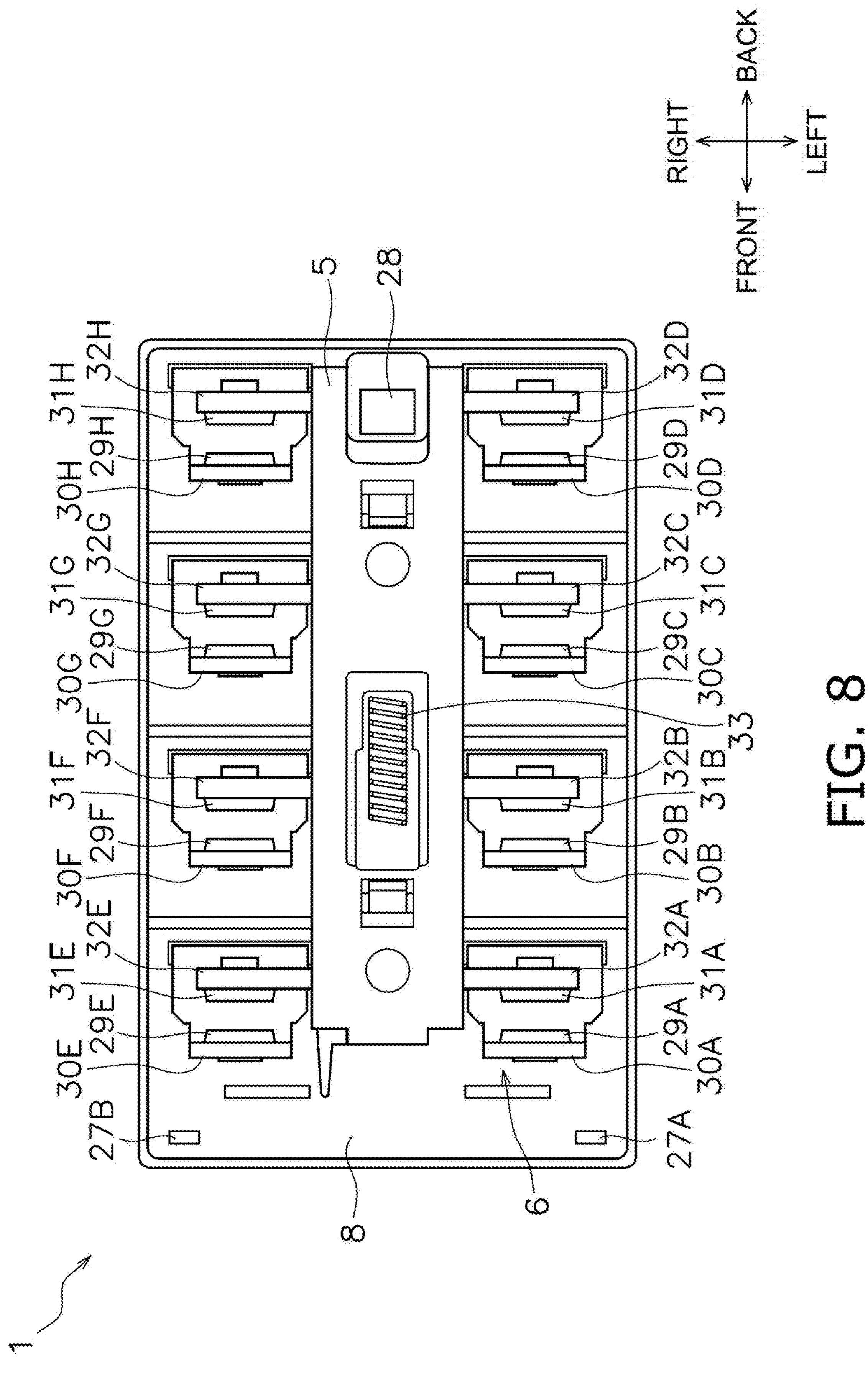
FIG. 8 is a top view of the electromagnetic relay shown in FIG. 7 with the drive unit and the inner board omitted.

The movable member 5 is made of an insulating material such as resin. FIG. 8 is a top view of the electromagnetic relay 1 shown in FIG. 7 with the drive unit 4 and the inner board 9 omitted. As shown in FIGS. 6 and 8, the movable member 5 extends in the front-rear direction. The movable member 5 is supported by the lower case 8 so as to be movable in the front-rear direction. The movable member 5 includes a receiving portion 28. The receiving portion 28 has a shape recessed from the upper surface of the movable member 5. The lower end of the armature 26 is disposed within the receiving portion 28. The movable member 5 moves back and forth when pressed by the lower end of the armature 26.

The contact unit 6 is disposed within the second internal space S3 between the lower case 8 and the inner board 9. The contact unit 6 and the first internal space S2 are separated by the partition wall 20. The contact unit 6 includes fixed contacts 29A to 29H, fixed terminals 30A to 30H, movable contacts 31A to 31H, and movable contact pieces 32A to 32H. The fixed terminals 30A to 30H extend in the vertical direction. The lower ends of the fixed terminals 30A to 30H protrude downward from the lower case 8.

The fixed contacts 29A to 29H are connected to the fixed terminals 30A to 30H, respectively. The movable contacts 31A to 31H are disposed to face the fixed contacts 29A to 29H, respectively. The movable contacts 31A to 31H are connected to the movable contact pieces 32A to 32H, respectively. The movable contact pieces 32A to 32H are supported by the movable member 5.

The movable contact pieces 32A to 32H move together with the movable member 5 in the front-rear direction. As the movable contact pieces 32A to 32H move in the contact direction, the movable contacts 31A to 31H come into contact with the fixed contacts 29A to 29H. As the movable contact pieces 32A to 32H move in the separation direction, the movable contacts 31A to 31H separate from the fixed contacts 29A to 29H. In this embodiment, the contact direction is forward and the separation direction is rearward. However, the contact direction and the separation direction are not limited to these directions and may be different directions. A return spring 33 is attached to the movable member 5. The return spring 33 biases the movable contact pieces 32A to 32H in the separation direction.

As shown in FIG. 6, contact springs 34A to 34D are disposed between the movable contact pieces 32A to 32D and the movable member 5. The contact springs 34A to 34D bias the movable contact pieces 32A to 32D in the contact direction, respectively. Although not shown, contact springs similar to the contact springs 34A to 34D are disposed between the movable contact pieces 32E to 32H and the movable member 5.

Next, the operation of the electromagnetic relay 1 will be described. When the coil 21 is not energized, the movable member 5 is pressed in the separation direction by the biasing forces of the hinge spring 25 and the return spring 33, and the movable member 5 is located in the open position shown in FIG. 8. In this state, the movable contacts 31A to 31H are separated from the fixed contacts 29A to 29H.

Figure 9:
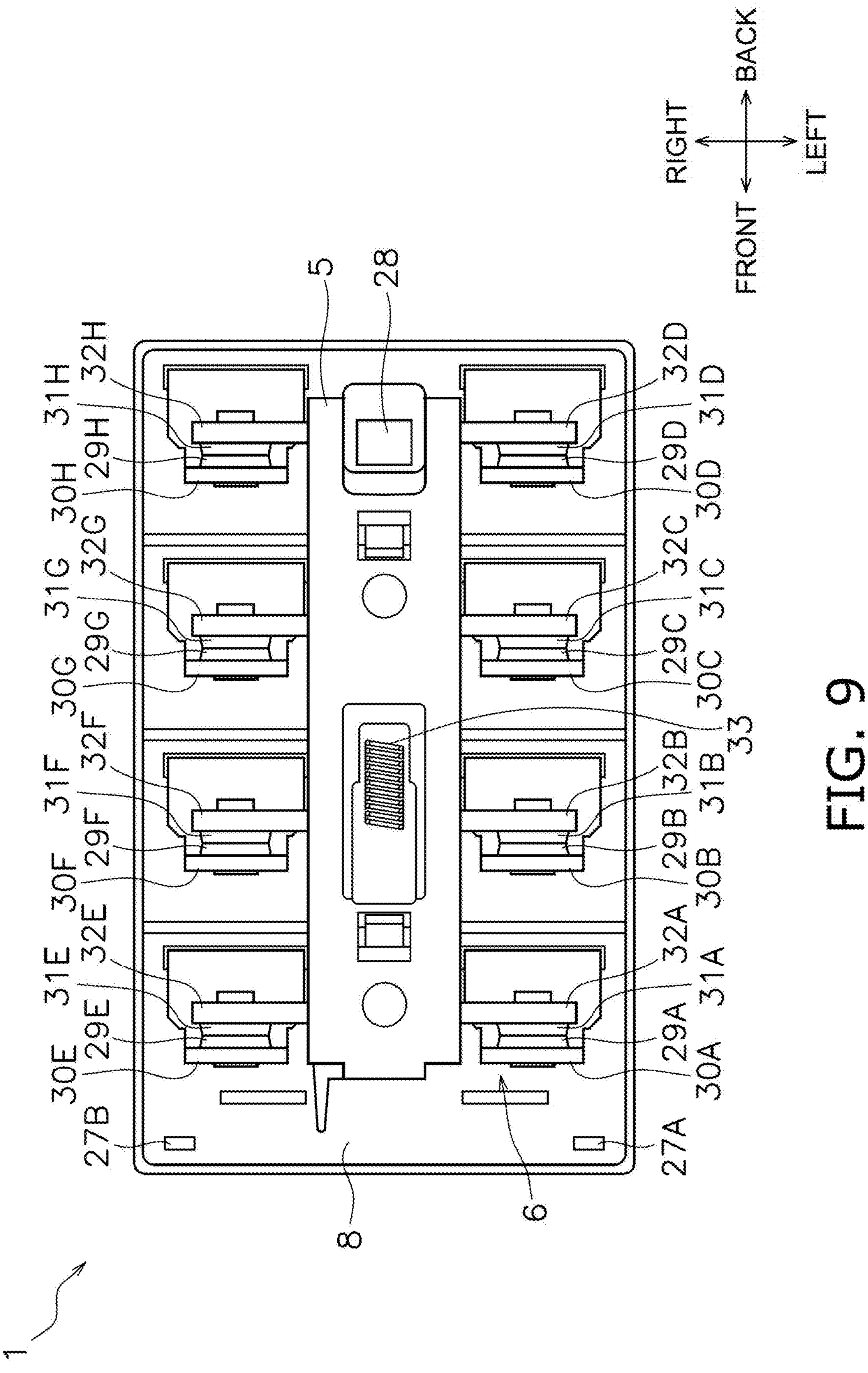
FIG. 9 is a top view of the electromagnetic relay shown in FIG. 7 with the drive unit and the inner board omitted.

When the coil 21 is energized, the armature 26 is attracted to the iron core 23 by the magnetic force of the coil 21 and rotates, and the movable member 5 is pressed by the armature 26 in the contact direction. As a result, the movable member 5 moves to the contact position shown in FIG. 9. The movable contact pieces 32A to 32H also move in the contact direction together with the movable member 5, and the movable contacts 31A to 31H come into contact with the fixed contacts 29A to 29H.

When the current supply to the coil 21 is stopped, the movable member 5 moves in the separation direction due to the biasing forces of the hinge spring 25 and the return spring 33. As a result, the movable member 5 returns to the open position shown in FIG. 8, and the movable contacts 31A to 31H are separated from the fixed contacts 29A to 29H.

Next, the pressure-relief structure of the electromagnetic relay 1 will be described. The electromagnetic relay 1 has a pressure-relief structure that releases the internal pressure of the case 2 when an arc occurs at the contacts. In detail, as shown in FIGS. 1 to 5, the upper case 7 includes a plurality of first engaged portions 40 and 41 and a plurality of second engaged portions 42 to 45. The first engaged portions 40 and 41 are provided on the left side surface 16 and the right side surface 17, which are the longer side surfaces of the upper case 7. The second engaged portions 42 to 45 are provided on the front surface 14 and the rear surface 15, which are the shorter side surfaces of the upper case 7. The plurality of second engaged portions 42 to 45 are disposed below the plurality of first engaged portions 40 and 41.

The plurality of first engaged portions 40 and 41 are holes. The plurality of first engaged portions 40 and 41 include a first left engaged portion 40 and a first right engaged portion 41. The first left engaged portion 40 is provided on the left side surface 16 of the upper case 7. The first left engaged portion 40 is disposed in the center of the left side surface 16 in the front-rear direction. The left side surface 16 includes a left convex portion 46. The left convex portion 46 protrudes from the outer surface of the left side surface 16. The left convex portion 46 extends in the vertical direction on the left side surface 16. The first left engaged portion 40 is provided on the left convex portion 46.

The first right engaged portion 41 is provided on the right side surface 17 of the upper case 7. The first right engaged portion 41 is disposed in the center of the right side surface 17 in the front-rear direction. The right side surface 17 includes a right convex portion 47. The right convex portion 47 protrudes from the outer surface of the right side surface 17. The right convex portion 47 extends in the vertical direction on the right side surface 17. The first right engaged portion 41 is provided on the right convex portion 47.

The upper case 7 includes a plurality of sub-openings 48 to 51. The second engaged portions 42 to 45 are the upper edges of the sub-openings 48 to 51, respectively. The plurality of second engaged portions 42 to 45 include a pair of second front engaged portions 42 to 43 and a pair of second rear engaged portions 44 to 45. The pair of second front engaged portions 42 to 43 are provided on the front surface 14 of the upper case 7. The front surface 14 includes a front recess 52. The front recess 52 is recessed from the outer surface of the front surface 14. The front recess 52 extends in the vertical direction on the front surface 14. The pair of second front engaged portions 42 to 43 are disposed on the left and right sides of the front recess 52, respectively. The rear surface 15 includes a rear recess 53. The rear recess 53 is recessed from the outer surface of the rear surface 15. The rear recess 53 extends in the vertical direction on the rear surface 15. The pair of second rear engaged portions 44 to 45 are disposed on the left and right sides of the rear recess 53, respectively.

The plurality of sub-openings 48 to 51 are provided in the side wall 11 of the upper case 7. The plurality of sub-openings 48 to 51 are disposed between the contact unit 6 and the first main opening 12. The sub-openings 48 to 51 extend in the vertical direction. The plurality of sub-openings 48 to 51 includes a pair of front sub-openings 48 and 49 and a pair of rear sub-openings 50 and 51. The pair of second front engaged portions 42 to 43 are upper edges of the pair of front sub-openings 48 and 49, respectively. The pair of second rear engaged portions 44 to 45 are upper edges of the pair of rear sub-openings 50 and 51, respectively.

The pair of front sub-openings 48 and 49 are provided on the front surface 14 of the upper case 7. The pair of front sub-openings 48 and 49 are disposed on the front surface 14 on the left and right sides of the front recess 52, respectively. The pair of rear sub-openings 50 and 51 are provided in the rear surface 15 of the upper case 7. The pair of rear sub-openings 50 and 51 are disposed on the rear surface 15 on the left and right sides of the rear recess 53, respectively.

Figure 10:
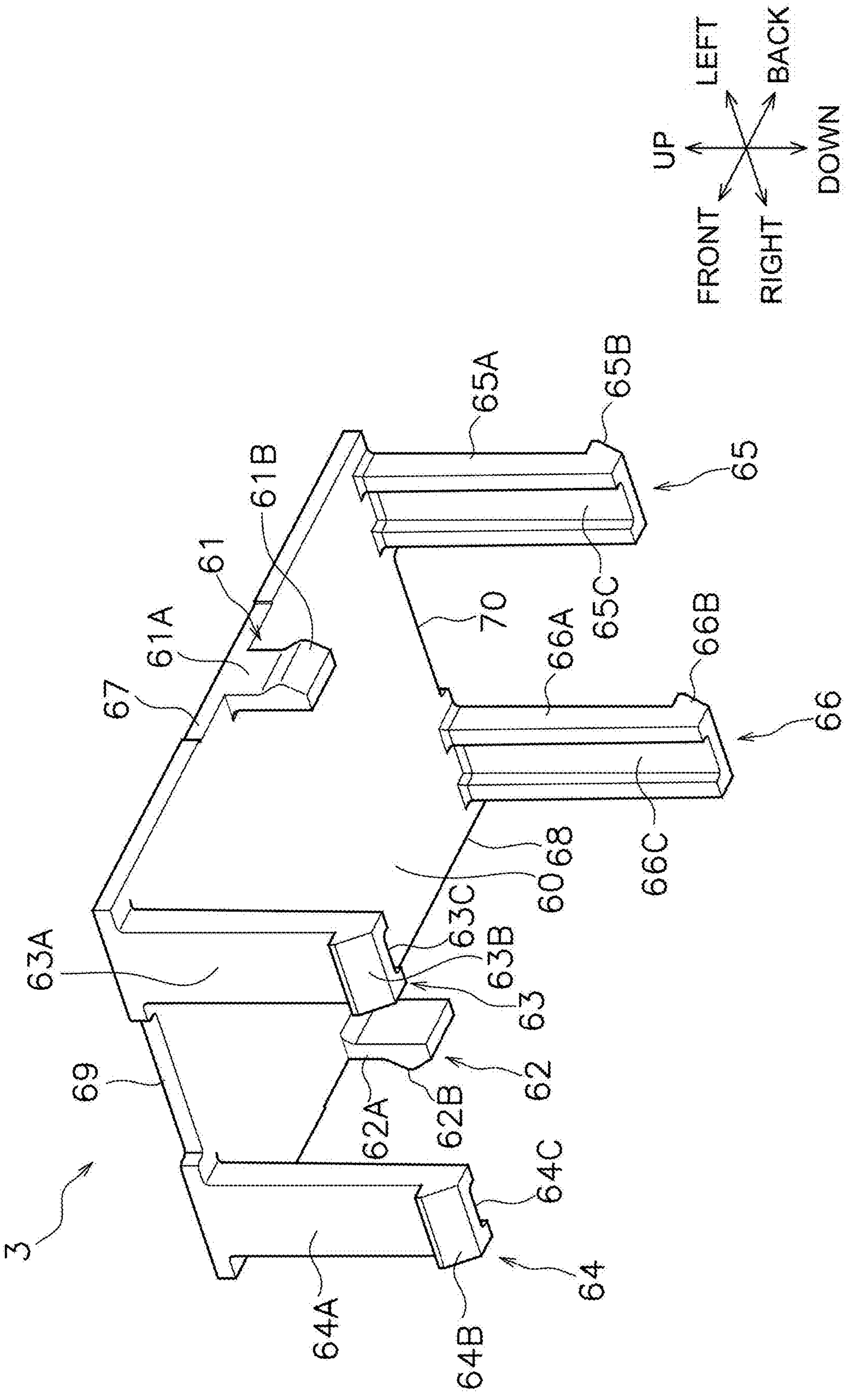
FIG. 10 is a perspective view of the cover.

FIG. 10 is a perspective view of the cover 3. As shown in FIG. 10, the cover 3 includes a cover body 60, a plurality of first engaging portions 61 and 62, and a plurality of second engaging portions 63 to 66. The cover body 60 has a rectangular plate shape. The cover body 60 covers the first main opening 12. For example, the cover body 60 has a shape that fits the first main opening 12. Alternatively, the cover body 60 may be larger than the first main opening 12. The plurality of first engaging portions 61 and 62 are connected to the cover body 60. The plurality of second engaging portions 63 to 66 are connected to the cover body 60 at positions different from the plurality of first engaging portions 61 and 62. The first engaging portions 61 and 62 are connected to a left edge 67 and a right edge 68, which are edges on the longer sides of the cover body 60, respectively. The second engaging portions 63 to 66 are respectively connected to a front edge 69 and a rear edge 70 which are edges on the shorter sides of the cover body 60. The second engaging portions 63 to 66 are each longer in the vertical direction than the first engaging portions 61 and 62.

In detail, the plurality of first engaging portions 61 and 62 include a first left engaging portion 61 and a first right engaging portion 62. The first left engaging portion 61 is connected to the left edge 67 of the cover body 60. The first left engaging portion 61 is connected to the center portion in the front-rear direction at the left edge 67. The first left engaging portion 61 includes a first left lever portion 61A and a first left hook portion 61B. The first left lever portion 61A extends downward from the cover body 60. The inner surface of the first left lever portion 61A has a flat shape. The first left hook portion 61B protrudes from the outer surface of the first left lever portion 61A.

The first right engaging portion 62 is connected to a right edge 68 of the cover body 60. The first right engaging portion 62 is connected to the center portion in the front-rear direction at the right edge 68. The first right engaging portion 62 includes a first right lever portion 62A and a first right hook portion 62B. The first right lever portion 62A extends downward from the cover body 60. The inner surface of the first right lever portion 62A has a flat shape. The first right hook portion 62B protrudes from the outer surface of the first right lever portion 62A.

The plurality of second engaging portions 63 to 66 include a pair of second front engaging portions 63 and 64 and a pair of second rear engaging portions 65 and 66. The pair of second front engaging portions 63 and 64 are connected to a front edge 69 of the cover body 60. The pair of second front engaging portions 63 and 64 are disposed on the front edge 69, spaced apart from each other on the left and right sides. The second front engaging portion 63 includes a second front lever portion 63A and a second front hook portion 63B. The second front lever portion 63A extends downward from the cover body 60. The inner surface of the second front lever portion 63A includes a front recessed groove 63C. The front recessed groove 63C extends in the vertical direction on the inner surface of the second front lever portion 63A. The second front lever portion 63A has a U-shaped cross section. This improves the rigidity of the second front lever portion 63A. The second front engaging portion 64 has a shape similar to that of the second front engaging portion 63, and includes a second front lever portion 64A, a second front hook portion 64B, and a front recessed groove 64C. The second front hook portions 63B and 64B are located lower than the first left hook portion 61B and the first right hook portion 62B. The second front hook portions 63B and 64B are disposed within the front sub-openings 48 and 49, respectively.

The pair of second rear engaging portions 65 and 66 are connected to a rear edge 70 of the cover body 60. The pair of second rear engaging portions 65 and 66 are disposed separately on the left and right sides of the rear edge 70. The second rear engaging portion 65 includes a second rear lever portion 65A and a second rear hook portion 65B. The second rear lever portion 65A extends downward from the cover body 60. The inner surface of the second rear lever portion 65A includes a rear recessed groove 65C. The rear recessed groove 65C extends in the vertical direction on the inner surface of the second rear lever portion 65A. The second rear lever portion 65A has a U-shaped cross section. This improves the rigidity of the second rear lever portion 65A. The second rear engaging portion 66 has a shape similar to that of the second rear engaging portion 65, and includes a second rear lever portion 66A and a second rear hook portion 66B. The second rear hook portions 65B and 66B are located lower than the first left hook portion 61B and the first right hook portion 62B. The second rear hook portions 65B and 66B are disposed within the rear sub-openings 50 and 51, respectively.

Figure 11:
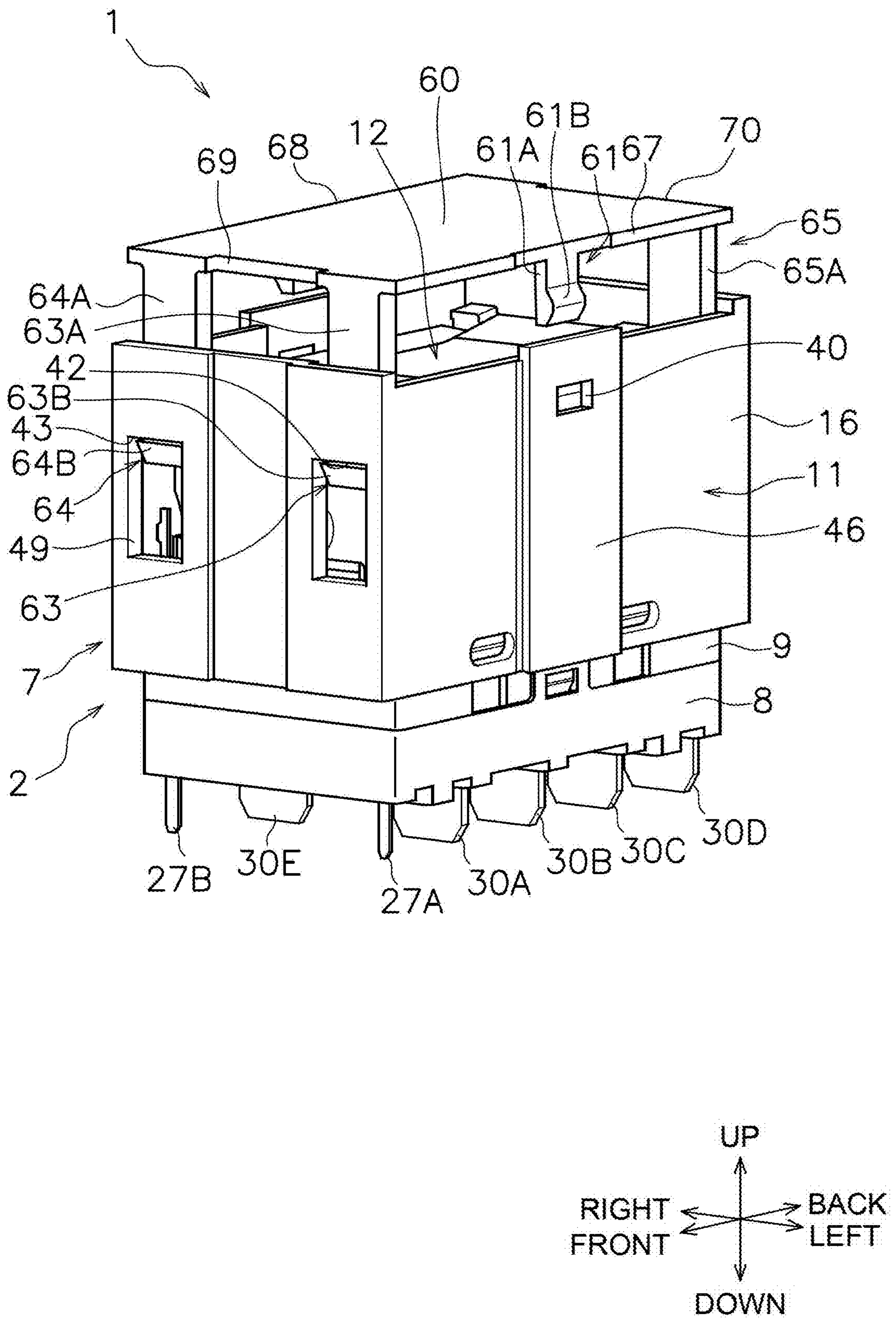
FIG. 11 is a perspective view of the electromagnetic relay with the cover in the pressure-relief position.
Figure 12:
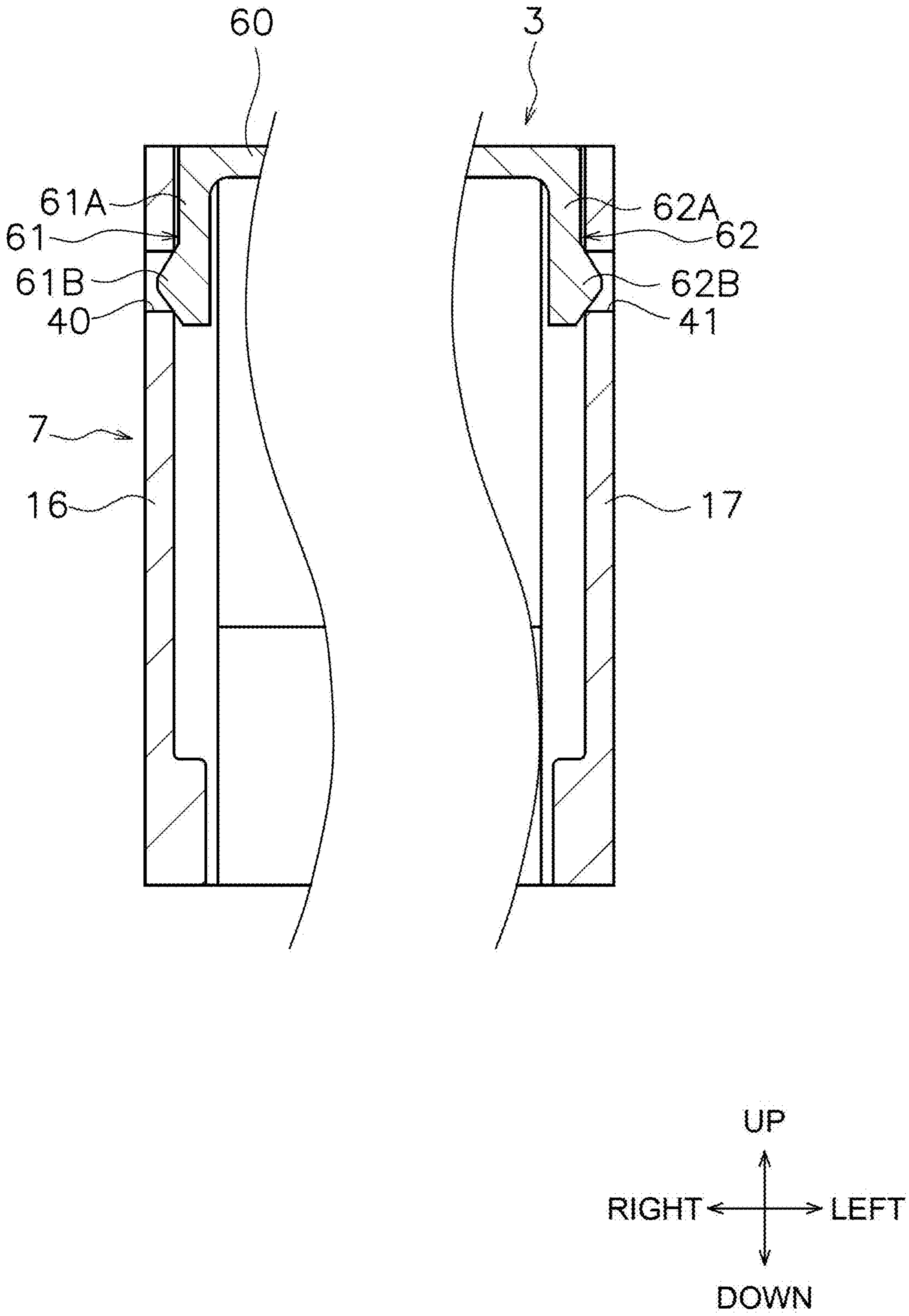
FIG. 12 is a cross-sectional view showing the first engaging portion and the first engaged portion when the cover is in the normal position.
Figure 13:
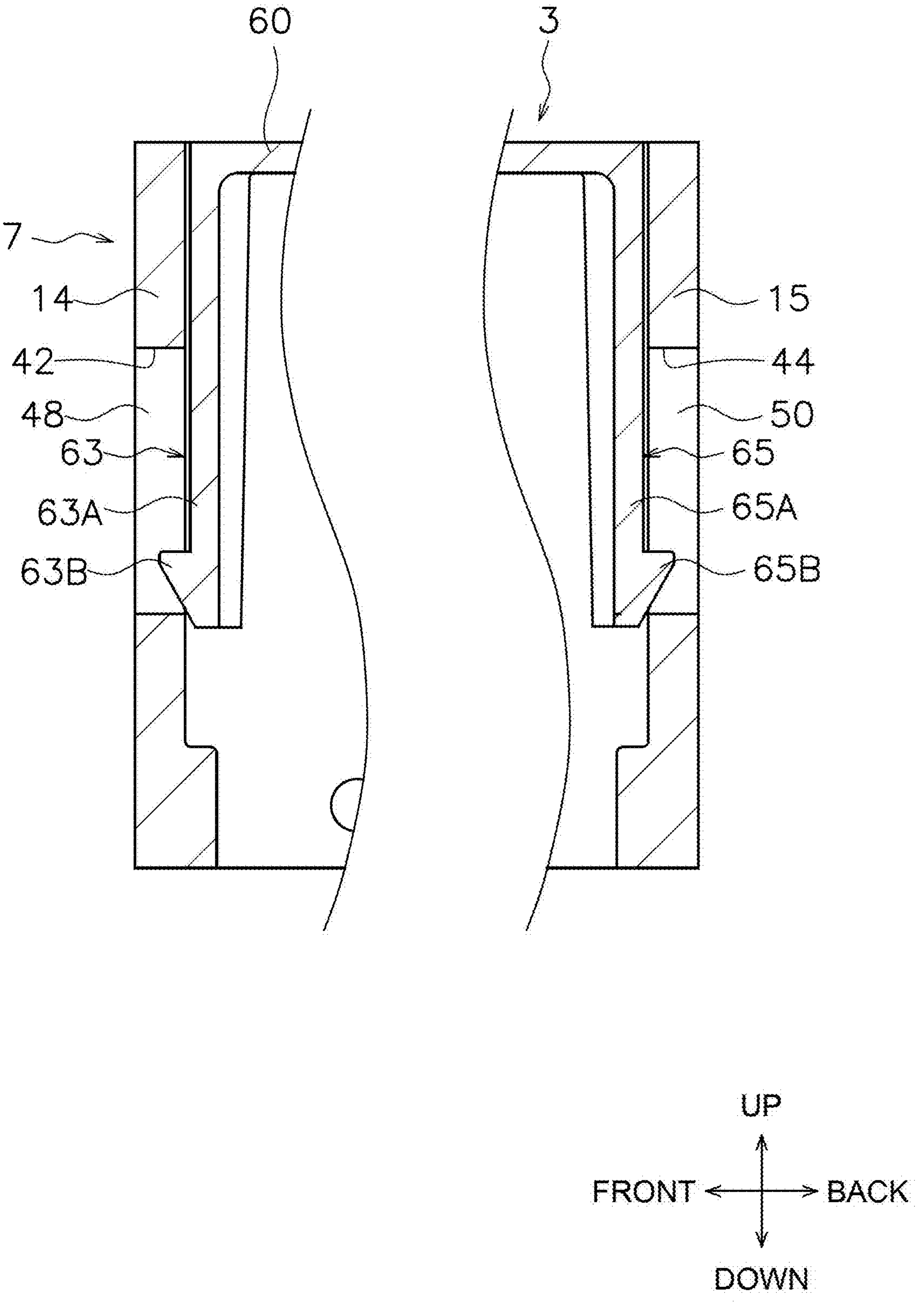
FIG. 13 is a cross-sectional view showing the second engaging portion and the second engaged portion when the cover is in the normal position.

The cover 3 is held in either a normal position shown in FIG. 1 or a pressure-relief position shown in FIG. 11. As shown in FIGS. 1 and 12, when the cover 3 is in the normal position, the first engaging portions 61 and 62 are engaged with the first engaged portions 40 and 41, respectively. That is, when the cover 3 is in the normal position, the first left engaging portion 61 engages with the first left engaged portion 40, and the first right engaging portion 62 engages with the first right engaged portion 41. In the normal position, the cover 3 is attached to the case 2 by snap-fitting between the plurality of first engaging portions 61 and 62 and the plurality of first engaged portions 40 and 41. In this state, the cover body 60 closes the first main opening 12. As shown in FIGS. 1 and 13, the second front engaging portion 63 faces the front sub-opening 48 and closes the front sub-opening 48. The second rear engaging portion 65 faces the rear sub-opening 50 and closes the rear sub-opening 50. Similarly to the second front engaging portion 63, the second front engaging portion 64 also faces the front sub-opening 49 and closes the front sub-opening 49. Similarly to the second rear engaging portion 65, the second rear engaging portion 66 also faces the rear sub-opening 51 and closes the rear sub-opening 51.

When an arc occurs at the contacts, the internal pressure of the case 2 increases due to the heat of the arc. Due to the increased internal pressure, a force acts on the cover 3 trying to lift it up from the case 2. Furthermore, due to the increased internal pressure, a force acts on the case 2 in a direction causing it to expand. These forces cause the cover 3 and the case 2 to elastically deform, causing the first engaging portions 61 and 62 to disengage from the first engaged portions 40 and 41, respectively. As a result, the cover 3 moves upward relative to the case 2.

Figure 14:
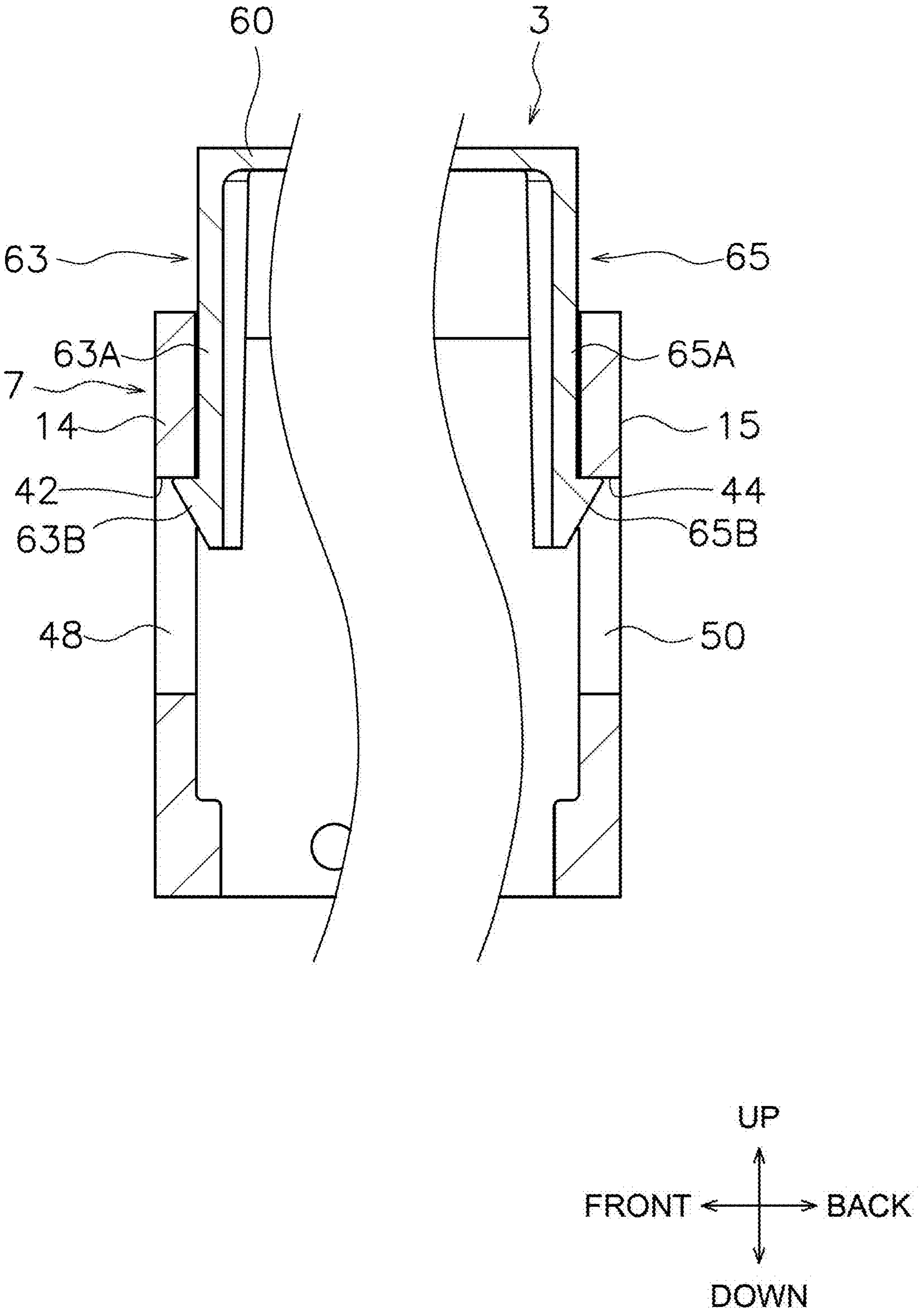
FIG. 14 is a cross-sectional view showing the second engaging portion and the second engaged portion when the cover is in the pressure-relief position.

After the cover 3 is raised, as shown in FIGS. 11 and 14, the second engaging portions 63 to 66 engage with the second engaged portions 42 to 45, respectively. This stops the lifting of the cover 3 and holds the cover 3 in the pressure-relief position. That is, when the cover 3 is located in the pressure-relief position, the pair of second front engaging portions 63 and 64 engage with the pair of second front engaged portions 42 to 43, respectively. Further, the pair of second rear engaging portions 65 and 66 engage with the pair of second rear engaged portions 44 to 45, respectively. In this state, the cover body 60 opens the first main opening 12. Furthermore, the cover body 60 is located above the upper edge of the side wall 11 of the upper case 7, and a gap is provided between the cover body 60 and the upper edge of the side wall 11. Therefore, air in the internal space S1 of the case 2 is discharged to the outside of the case 2 through the first main opening 12 and the gap. This reduces the internal pressure in the case 2, thereby preventing the cover 3 from being blown off. The cover 3 can be returned from the pressure-relief position to the normal position by being pushed downward toward the case 2.

When the cover 3 moves from the normal position to the pressure-relief position, the second front engaging portions 63 and 64 move along the front sub-openings 48 and 49. As a result, the second front engaging portions 63 and 64 open the front sub-openings 48 and 49. In addition, the second rear engaging portions 65 and 66 move along the rear sub-openings 50 and 51. As a result, the second rear engaging portions 65 and 66 open the rear sub-openings 50 and 51. The front sub-openings 48 and 49 and the rear sub-openings 50 and 51 are disposed between the contact unit 6 and the first main opening 12. Therefore, air in the internal space S1 is released through the front sub-openings 48 and 49 and the rear sub-openings 50 and 51, thereby reducing the pressure acting on the cover 3. This reduces the stress on the second engaging portions 63 to 66, preventing damage to the second engaging portions 63 to 66.

Further, the contact unit 6 and the first main opening 12 are separated by a partition wall 20. Therefore, even when the first main opening 12 is open, the arc from the contact unit 6 or molten metal caused by the arc is unlikely to escape to the outside of the case 2.

In the electromagnetic relay 1 described above, the above-mentioned pressure-relief structure prevents the cover 3 from being blown off. Furthermore, in the electromagnetic relay 1, the second engaging portions 63 to 66 are connected to the cover body 60 at positions different from those at which the first engaging portions 61 and 62 are connected. The second engaged portions 42 to 45 are provided at positions different from the first engaged portions 40 and 41. Therefore, it is easy to adjust the degree of engagement, including the rigidity of the first engaging portions 61 and 62 and the second engaging portions 63 to 66, and the rigidity of the first engaged portions 40 and 41 and the second engaged portions 42 to 45, at the time of design.

For example, by having the portion of the cover body 60 to which the first engaging portions 61 and 62 are connected different from the portion to which the second engaging portions 63 to 66 are connected, it is possible to adjust the strength of engagement of the first engaging portions 61 and 62 and the second engaging portions 63 to 66. That is, in the above embodiment, the first engaging portions 61 and 62 are connected to the left edge 67 and the right edge 68 on the long side with low rigidity. This results in a weaker engagement. The second engaging portions 63 to 66 are connected to the front edge 69 and the rear edge 70 on the short side having higher rigidity. This results in a stronger engagement. In addition, by making the cross-sectional shapes of the first engaging portions 61 and 62 and the second engaging portions 63 to 66 different, it is possible to adjust the rigidity of the first engaging portions 61 and 62 and the second engaging portions 63 to 66.

In the side wall 11 of the case 2, the portion where the first engaged portions 40 and 41 are provided is different from the portion where the second engaged portions 42 to 45 are provided, so that it is possible to adjust the rigidity of the first engaged portions 40 and 41 and the second engaged portions 42 to 45. That is, in the above embodiment, the first engaged portions 40 and 41 are provided on the left side surface 16 and the right side surface 17 on the long side, thereby reducing the rigidity. The second engaged portions 42 to 45 are provided on the front surface 14 and rear surface 15 of the short side, thereby increasing rigidity. This makes it easier for the first engaging portions 61 and 62 to come off from the first engaged portions 40 and 41. On the other hand, the second engaging portions 63 to 66 are difficult to come off from the second engaged portions 42 to 45.

Although one embodiment of the claimed invention has been described above, the claimed invention is not limited to the above embodiment, and various modifications are possible without departing from the scope of the claimed invention.

The configuration of the electromagnetic relay 1 is not limited to that of the above embodiment and may be modified. The configuration of the contact unit 6 is not limited to that in the above embodiment and may be modified. For example, the number of movable contacts and the number of fixed contacts are not limited to those in the above embodiment and may be changed.

The configuration of the drive unit 4 is not limited to that in the above embodiment and may be modified. For example, the drive unit 4 may be of a so-called plunger type. The coil 21, the coil terminals 27A and 27B, and the yoke 24 may be partially or entirely covered with a resin mold. In this case, dielectric breakdown of the drive unit 4 due to molten metal or the like coming from the contact unit 6 is prevented.

The configurations of the case 2 and the cover 3 are not limited to those in the above embodiment and may be modified. For example, the shapes of the first engaged portions 40 and 41, the second engaged portions 42 to 45, the first engaging portions 61 and 62, or the second engaging portions 63 to 66 are not limited to those in the above embodiment and may be modified. In the above embodiment, the first engaged portions 40 and 41 are holes, and the first engaging portions 61 and 62 are hook-shaped. However, conversely, the first engaged portions 40 and 41 may have a hook shape, and the first engaging portions 61 and 62 may be holes. In the above embodiment, the second engaged portions 42 to 45 are holes, and the second engaging portions 63 to 66 are hook-shaped. However, conversely, the second engaged portions 42 to 45 may have a hook shape, and the second engaging portions 63 to 66 may be holes.

The second engaging portions 63 to 66 are not limited to having a U-shaped cross-sectional shape as in the above embodiment, and may have other cross-sectional shapes. For example, the second engaging portions 63 to 66 may have a T-shaped or semicircular cross-sectional shape.

Figure 15:
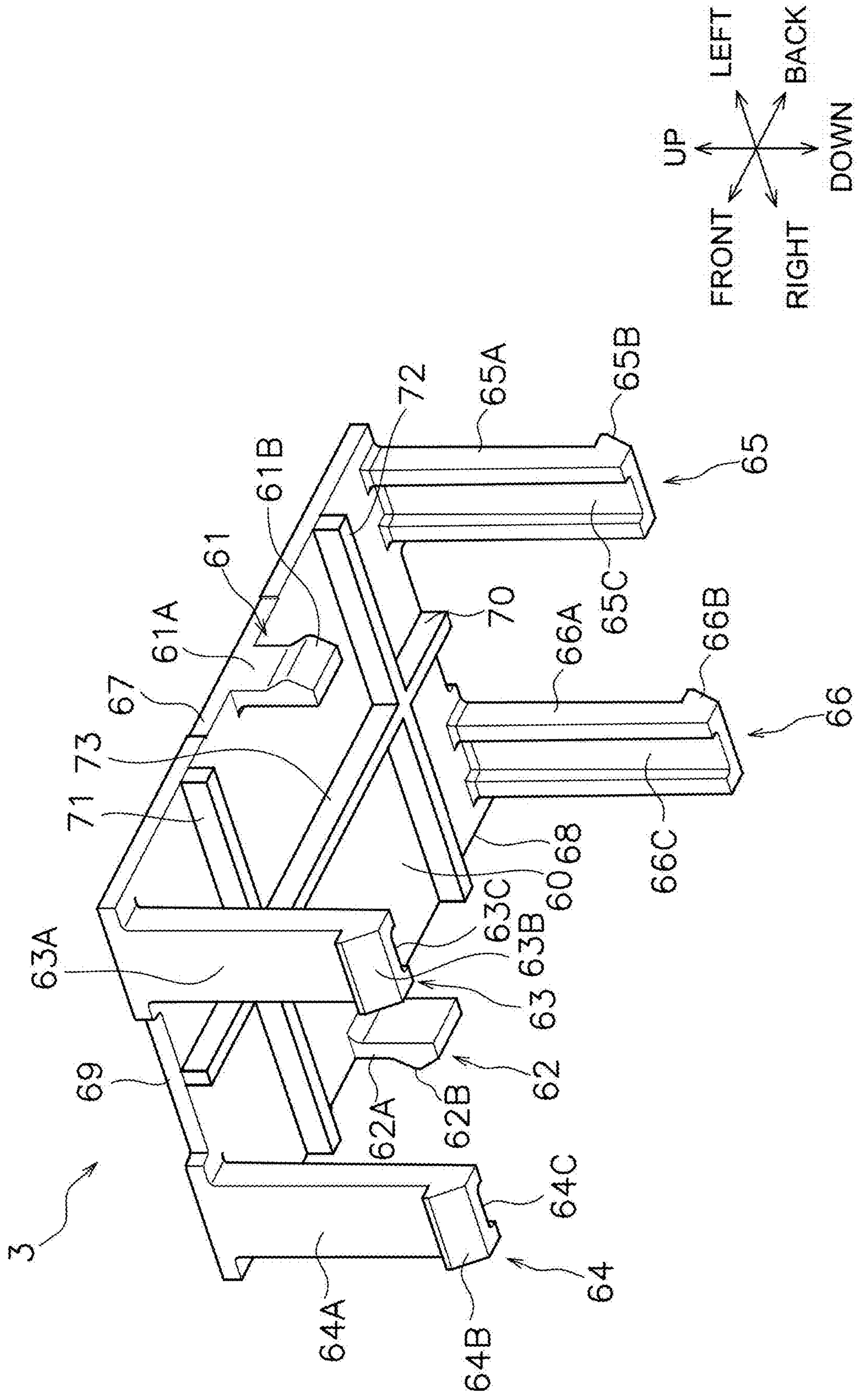
FIG. 15 is a perspective view showing a cover of an electromagnetic relay according to a first modified example.

FIG. 15 is a perspective view showing a cover 3 of an electromagnetic relay 1 according to a first modified example. As shown in FIG. 15, the cover 3 may include reinforcing ribs 71 to 73 connected to the cover body 60. In this case, the increased rigidity of the cover 3 makes it even more difficult for the second engaging portions 63 to 66 to come off the second engaged portions 42 to 45.

Figure 16:
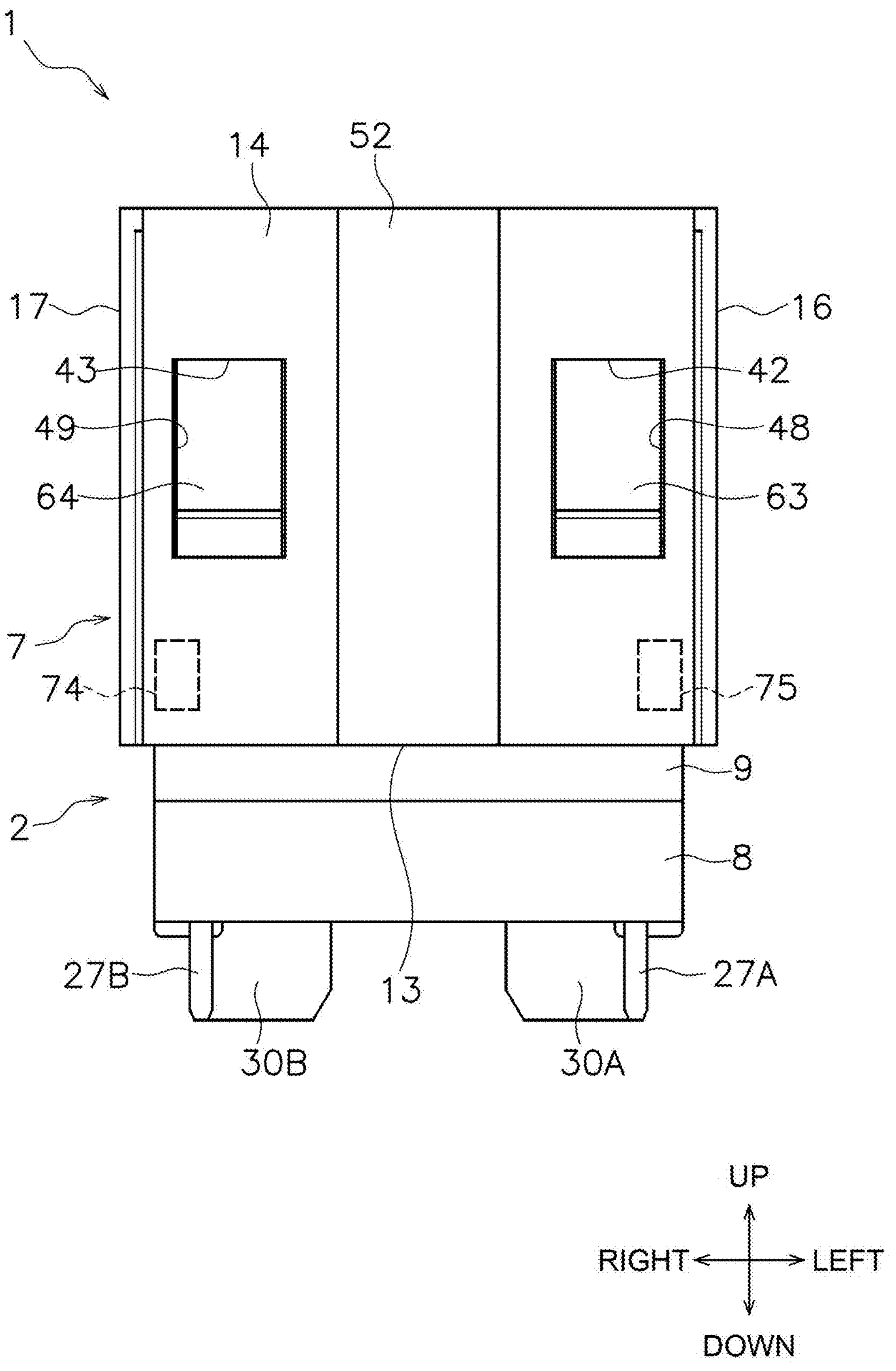
FIG. 16 is a front view showing an electromagnetic relay according to a second modified example.

FIG. 16 is a front view showing an electromagnetic relay 1 according to a second modified example. As shown in FIG. 16, magnets 74 and 75 for arc control may be disposed inside the case 2. For example, the magnets 74 and 75 may be disposed within the first internal space S2 of the upper case 7. Alternatively, the magnets 74 and 75 may be disposed within the second internal space S3 of the lower case 8 and the inner board 9. The magnets 74 and 75 may be arranged so as to extend the arc in a direction different from the pressure-relief path from the contact unit 6 toward the first main opening 12. This prevents the arc from leaking outside the case 2 when the cover 3 is in the pressure-relief position.

Figure 17:
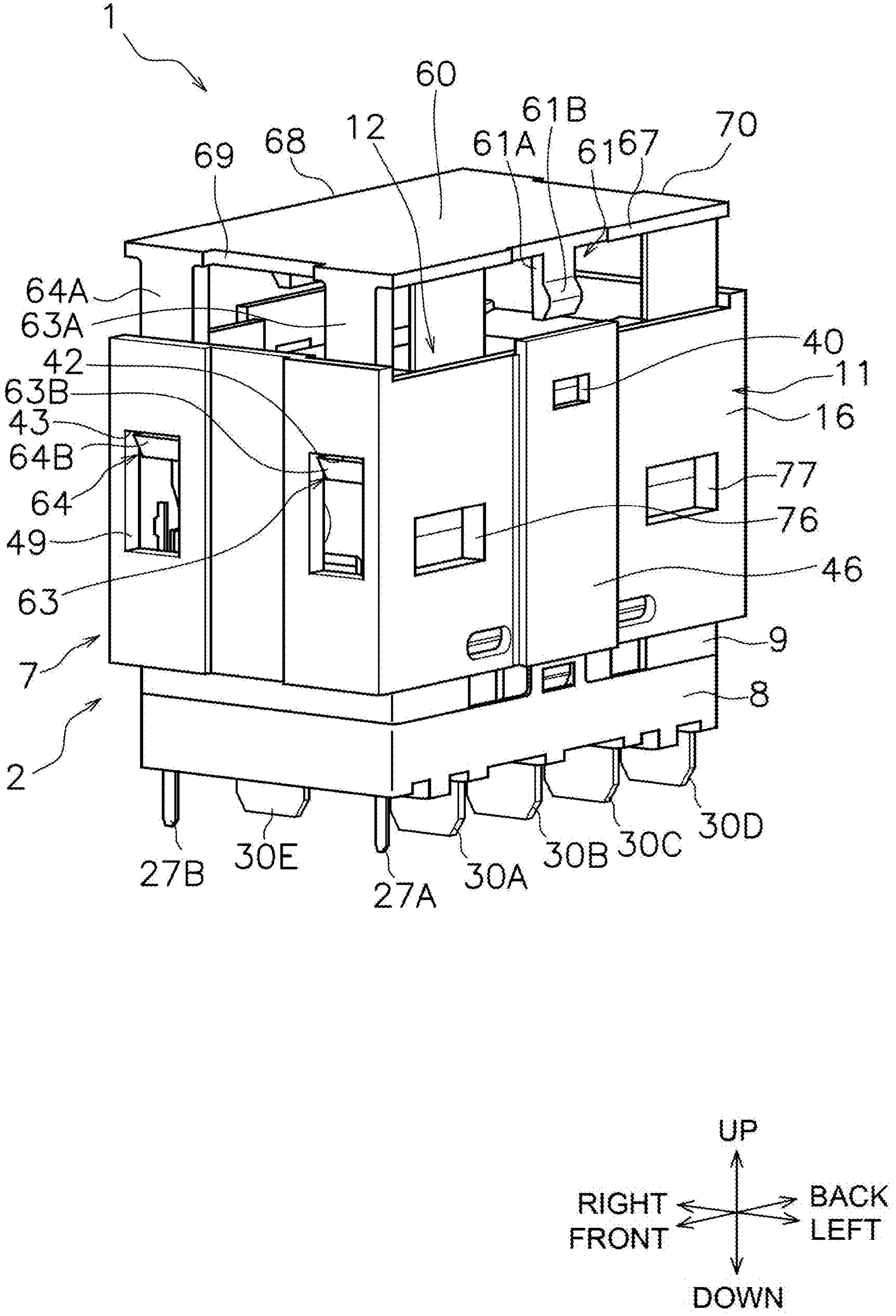
FIG. 17 is a perspective view showing an electromagnetic relay according to a third modified example.

FIG. 17 is a perspective view showing an electromagnetic relay 1 according to a third modified example. As shown in FIG. 17, the case 2 may further include second sub-openings 76 and 77 in addition to the sub-openings 48 to 51 (first sub-openings) described above. The second sub-openings 76 and 77 may be provided on the left side surface 16 on the long side. Although not shown in the figure, second sub-openings may also be provided in the right side surface 17, similar to the second sub-openings 76 and 77. In this case, the pressure-relief performance of the electromagnetic relay 1 is further improved.

Figure 18:
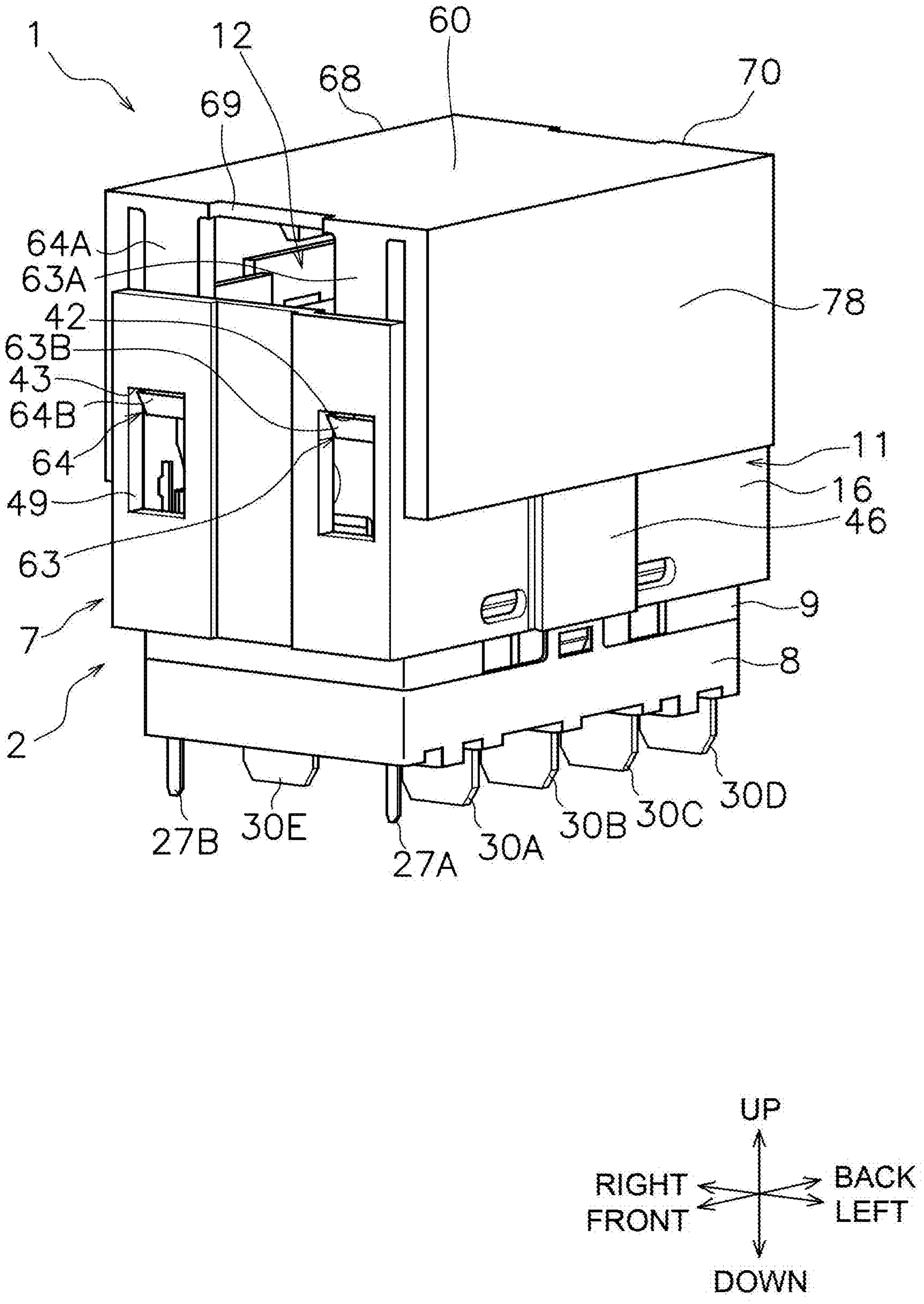
FIG. 18 is a perspective view showing an electromagnetic relay according to a fourth modified example.

FIG. 18 is a perspective view showing an electromagnetic relay 1 according to a fourth modified example. As shown in FIG. 18, the cover 3 may include a gap cover portion 78. The gap cover portion 78 may be arranged to close the gap between the cover body 60 and the case 2 when the cover 3 is in the pressure-relief position. In this case, the direction in which the arc, molten metal, or the like leaks from the case 2 can be controlled.

Figure 19:
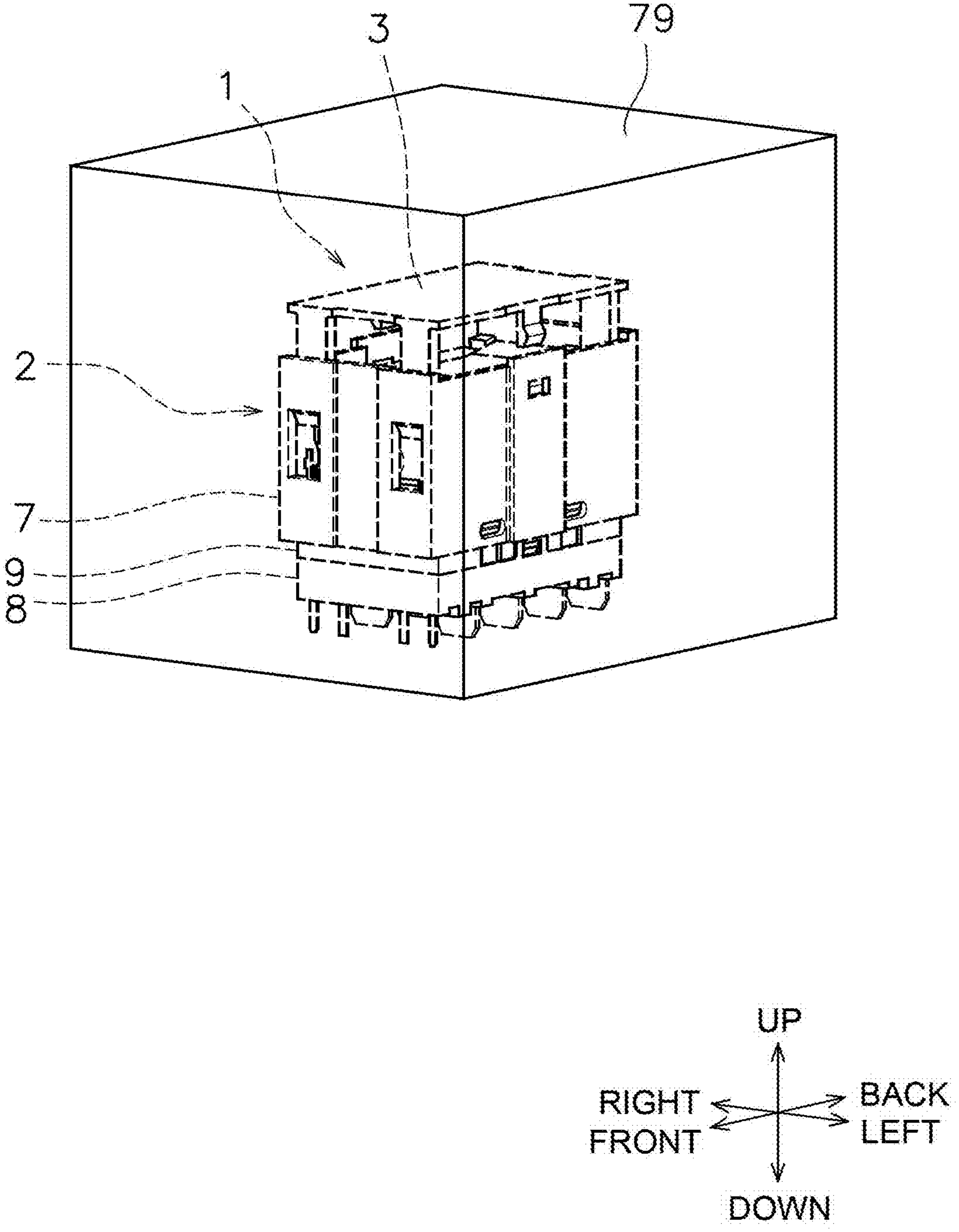
FIG. 19 is a perspective view showing an electromagnetic relay according to a fifth modified example.

FIG. 19 is a perspective view showing an electromagnetic relay 1 according to a fifth modified example. As shown in FIG. 19, an outer cover 79 for covering the electromagnetic relay 1 may be provided. The outer cover 79 may be disposed so as to cover at least the gap between the cover 3 and the case 2 when the cover 3 is in the pressure-relief position. This improves protection of the peripheral circuits of the electromagnetic relay 1 when the pressure is released.

In the above embodiment, the cover 3 moves parallel to the upper direction relative to the case 2 to open the first main opening 12. However, the manner in which the cover 3 moves is not limited to that in the above embodiment and may be changed.

Figure 20:
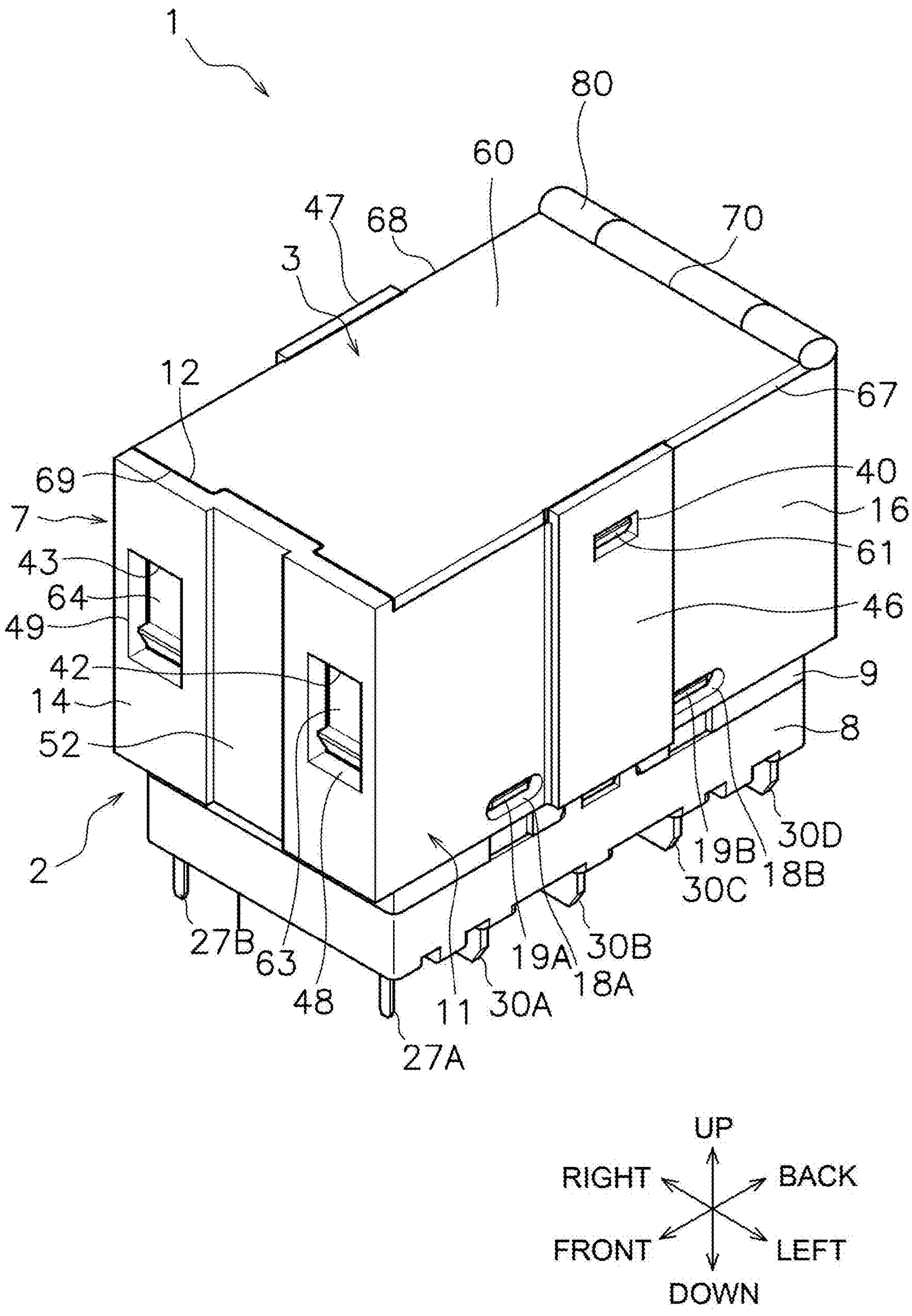
FIG. 20 is a perspective view showing an electromagnetic relay according to a sixth modified example.

For example, FIG. 20 is a perspective view showing an electromagnetic relay 1 according to a sixth modified example. As shown in FIG. 20, the case 2 may include a hinge 80. The cover 3 may be rotatably supported on the hinge 80. In this case, the direction in which air leaks to the outside when pressure is released can be easily controlled.

Figure 21:
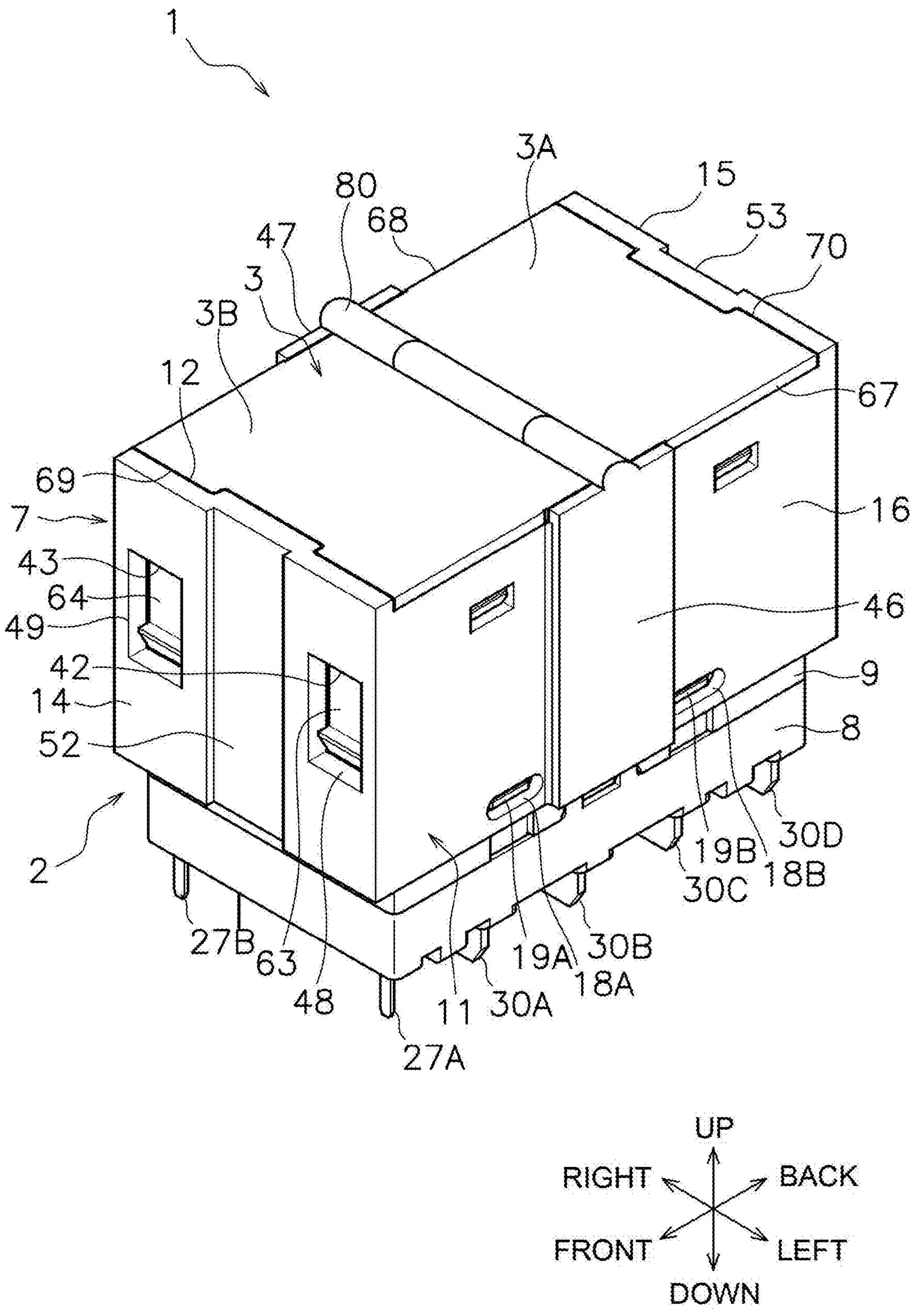
FIG. 21 is a perspective view showing an electromagnetic relay according to a seventh modified example.

The cover 3 is not limited to a single-opening type as in the sixth modified example shown in FIG. 20, but may be a double-opening type. FIG. 21 is a perspective view showing an electromagnetic relay 1 according to a seventh modified example. As shown in FIG. 21, the cover 3 may include a first cover portion 3A and a second cover portion 3B that are separate bodies from each other. The first cover portion 3A and the second cover portion 3B may be rotatable about the hinge 80 independently of each other.

Figure 22:
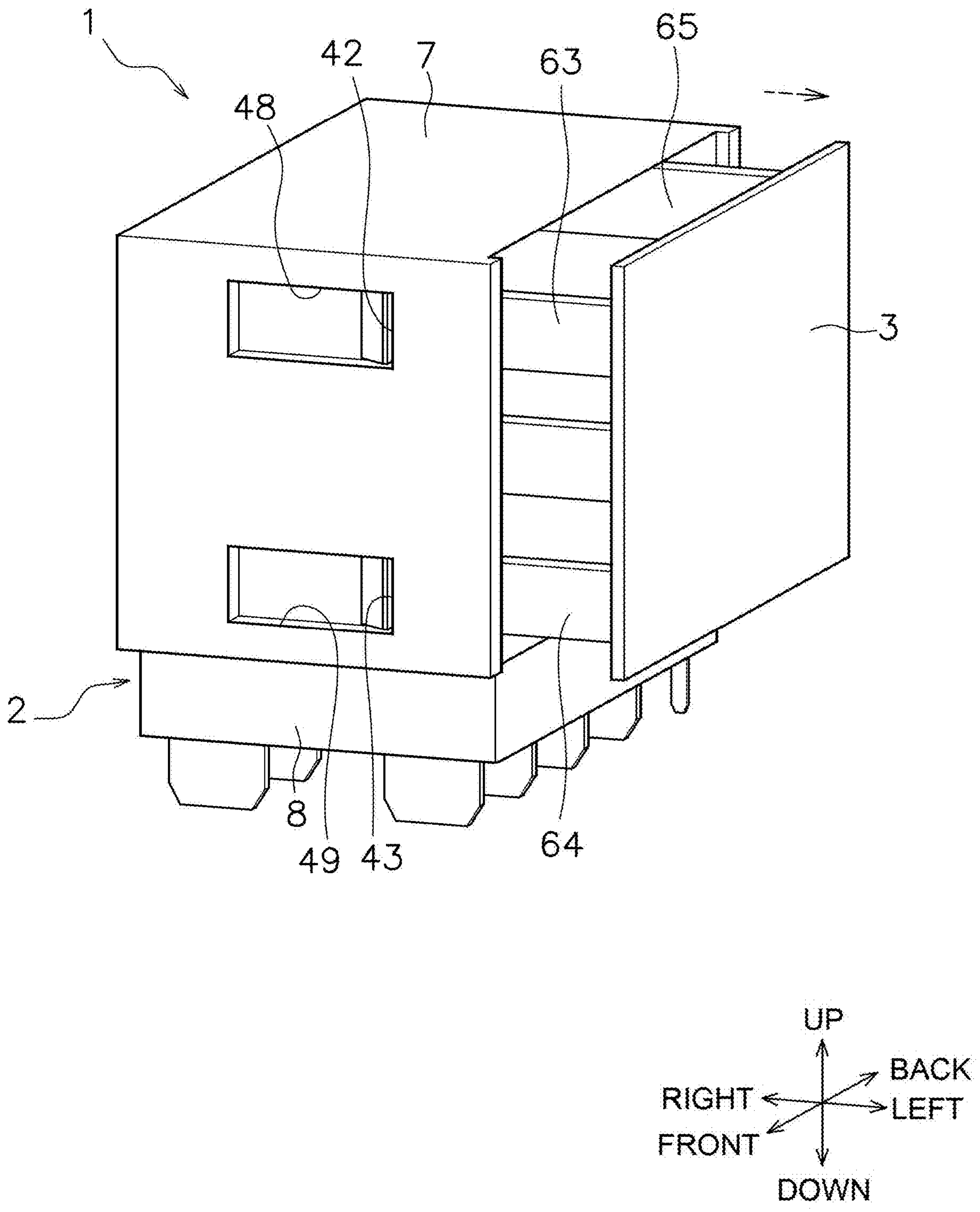
FIG. 22 is a perspective view showing an electromagnetic relay according to an eighth modified example.

FIG. 22 is a perspective view showing an electromagnetic relay 1 according to an eighth modified example. As shown in FIG. 22, the cover 3 may be moved laterally relative to the case 2 to move from the normal position to the pressure-relief position.

Figure 23:
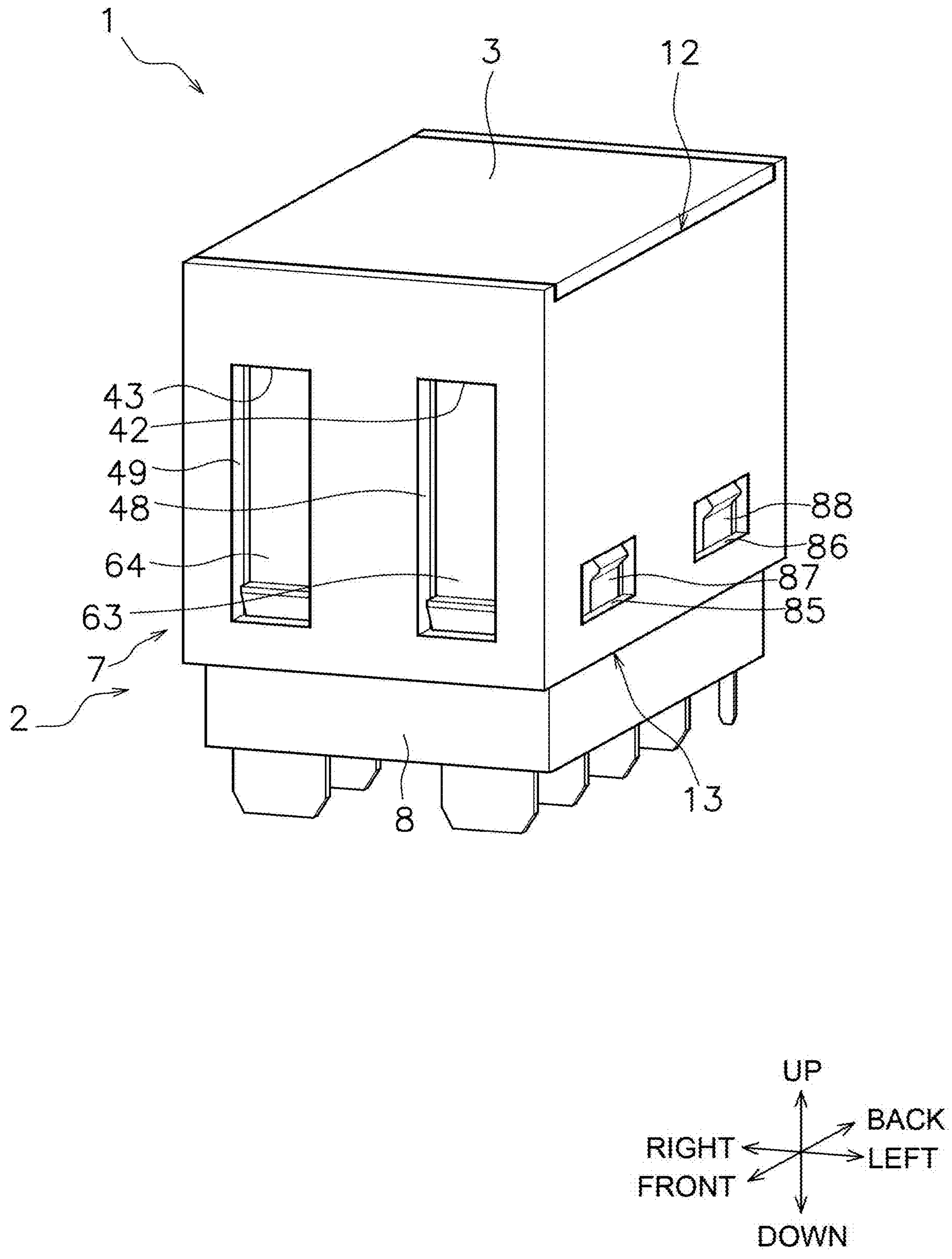
FIG. 23 is a perspective view showing an electromagnetic relay according to a ninth modified example.
Figure 24:
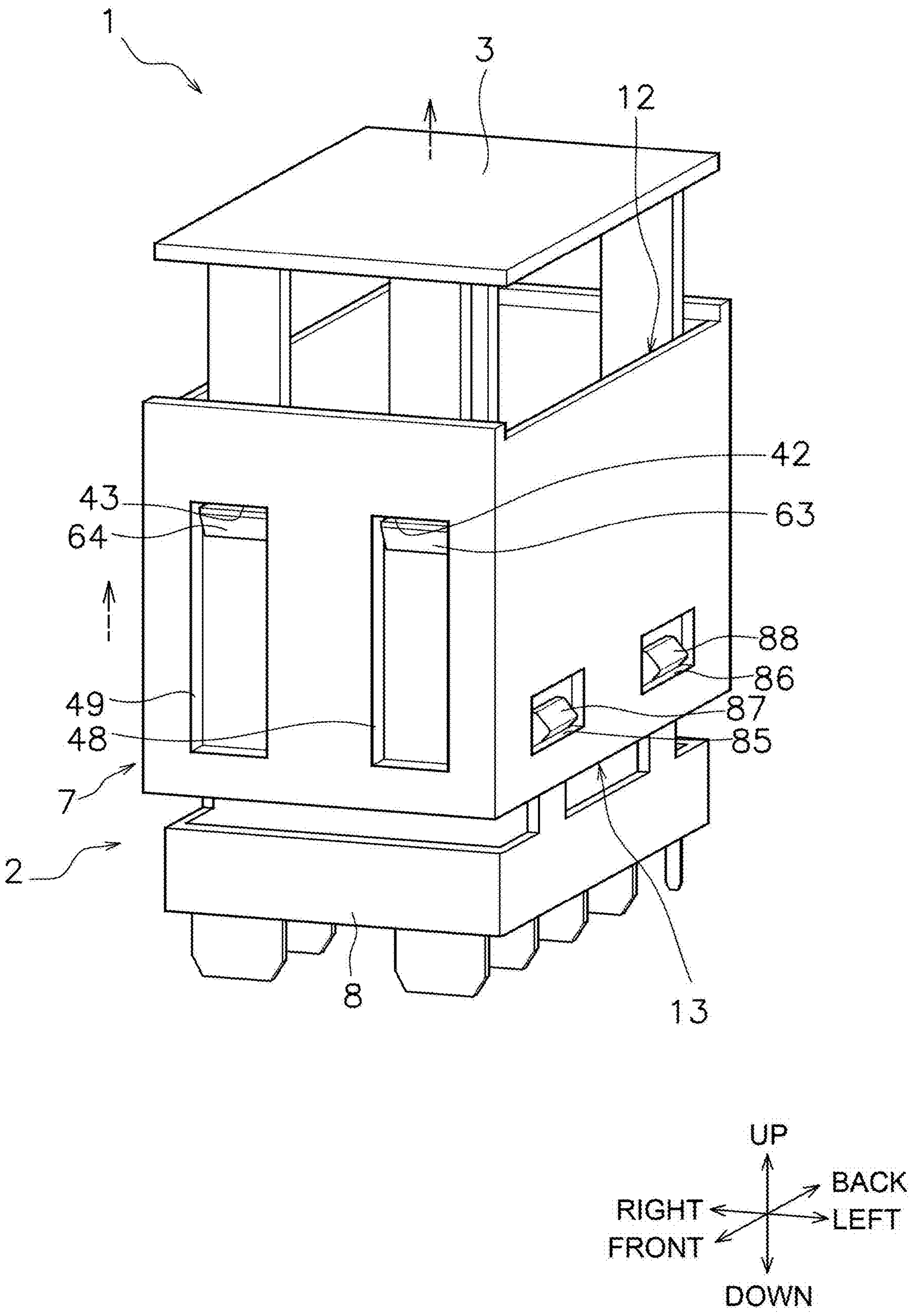
FIG. 24 is a perspective view showing the electromagnetic relay according to the ninth modified example.

FIGS. 23 and 24 are perspective views showing an electromagnetic relay 1 according to a ninth modified example. As shown in FIGS. 23 and 24, the upper case 7 may be held in either the normal position shown in FIG. 23 or the pressure-relief position shown in FIG. 24. In the normal position shown in FIG. 23, the cover 3 may close the first main opening 12, and the lower case 8 may close the second main opening 13. In the pressure-relief position shown in FIG. 24, the cover 3 may open the first main opening 12 and the lower case 8 may open the second main opening 13.

The upper case 7 may include third engaged portions 85 and 86. The lower case 8 or the inner board 9 may include third engaging portions 87 and 88. The above-mentioned mounting claws 19A and 19B may be engaged with the mounting holes 18A and 18B, so that the upper case 7 may be held in the normal position as shown in FIG. 23. As the internal pressure increases, the mounting claws 19A and 19B disengage from the mounting holes 18A and 18B, and then the third engaging portions 87 and 88 engage with the third engaged portions 85 and 86, thereby holding the upper case 7 in the pressure-relief position, as shown in FIG. 24. In this case, the pressure-relief performance of the electromagnetic relay 1 is further improved.

Figure 25:
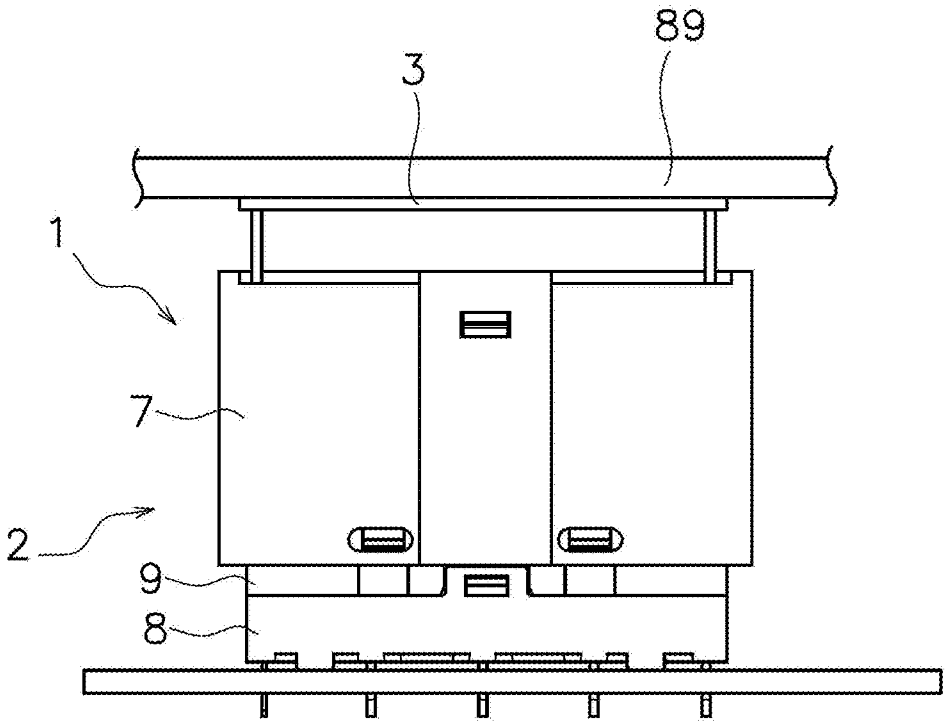
FIG. 25 is a side view showing an electromagnetic relay according to a tenth modified example.
Figure 25:
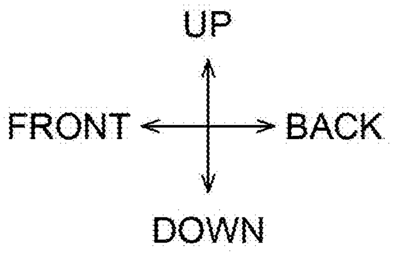

FIG. 25 is a side view showing an electromagnetic relay 1 according to a tenth modified example. As shown in FIG. 25, a pressing plate 89 may be disposed above the cover 3 to prevent the cover 3 and the upper case 7 from being blown away.

Figure 26:
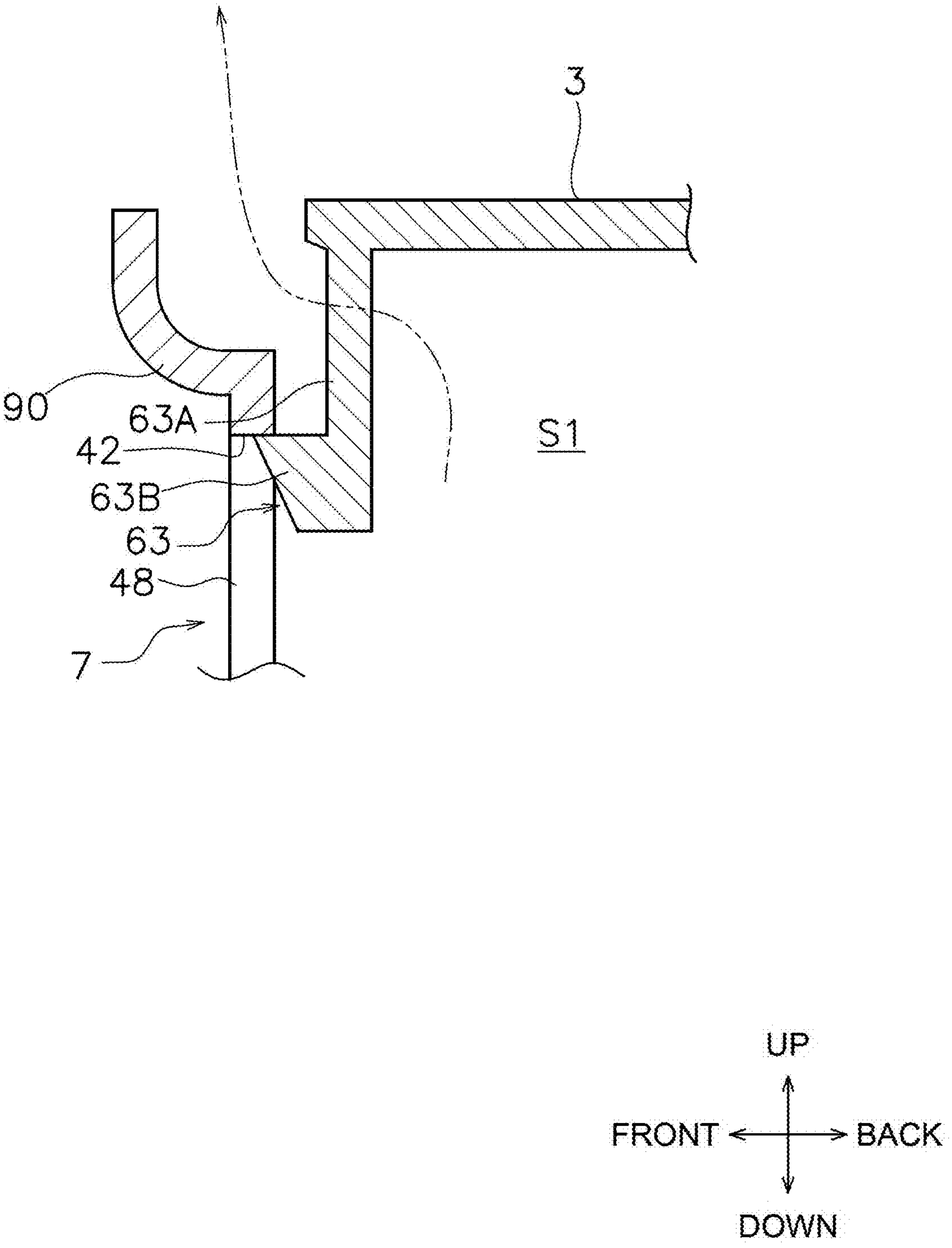
FIG. 26 is a cross-sectional view of a cover and a case of an electromagnetic relay according to an eleventh modified example.

FIG. 26 is a cross-sectional view of the cover 3 and the case 2 of an electromagnetic relay 1 according to an eleventh modification. As shown in FIG. 26, the upper case 7 may include a guide 90. The guide 90 may be arranged to guide air flowing out from the gap between the cover 3 and the upper case 7 when the cover 3 is in the pressure-relief position. In this case, the direction in which air leaks to the outside when pressure is released can be easily controlled.

Figure 27:
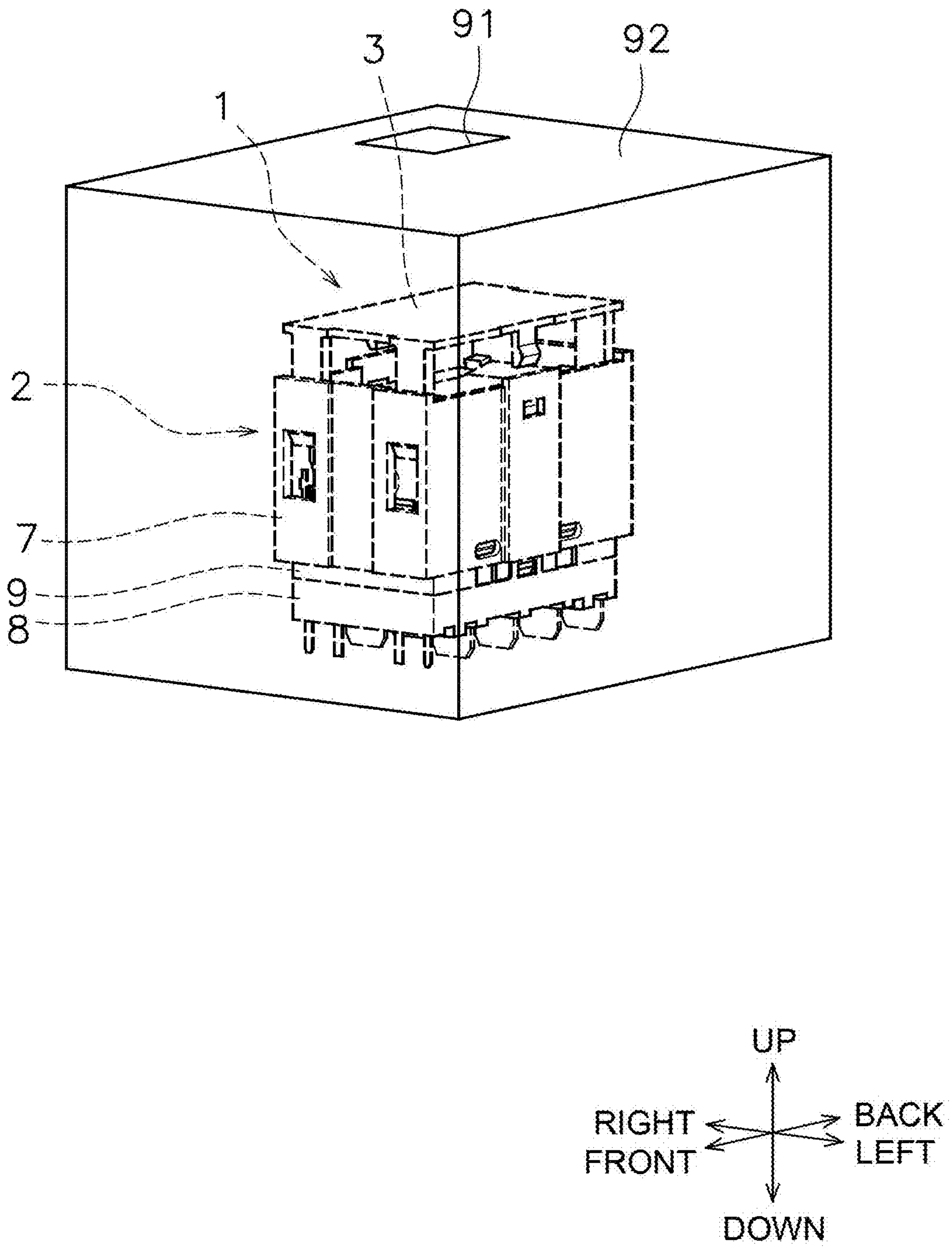
FIG. 27 is a perspective view showing an electromagnetic relay according to a twelfth modified example.

FIG. 27 is a perspective view showing an electromagnetic relay 1 according to a twelfth modified example. As shown in FIG. 27, the electromagnetic relay 1 may be covered by an outer cover 92 having a ventilation hole 91. The ventilation hole 91 may connect the space inside the outer cover 92 to the outside of the outer cover 92. In this case, the direction in which the arc, molten metal, or the like leaks from the case 2 can be controlled.

REFERENCE SIGNS LIST

2: Case, 3: Cover, 6: Contact unit, 7: Upper case, 8: Lower case, 11: Side wall, 12: First main opening, 13: Second main opening, 14: Front surface, 15: Rear surface, 16: Left side surface, 17: Right side surface, 20: Partition wall, 29A: Fixed contact, 31A: Movable contact, S1: Internal space, 40: First engaged portion, 42: Second engaged portion, 48: Sub-opening (first sub-opening), 60: Cover body, 61: First engaging portion, 63: Second engaging portion, 67: Left edge, 68: Right edge, 69: Front edge, 70: Rear edge, 71: Reinforcing rib, 76: Second sub-opening, 78: Gap cover portion, 80: Hinge, 90: Guide

The invention claimed is:

1. An electromagnetic relay, comprising:
   - a contact unit including a fixed contact and a movable contact;
   - a case including
     - an internal space in which the contact unit is disposed,
     - a side wall surrounding the internal space,
     - a first main opening providing communication between the internal space and an outside of the case,
     - a first engaged portion, and
     - a second engaged portion; and
   - a cover attached to the case, the cover including
     - a cover body,
     - a first engaging portion connected to the cover body, and a second engaging portion connected to the cover body at a position different from the first engaging portion, the cover being held in either a normal position in which the first engaging portion engages with the first engaged portion and the cover body closes the first main opening, or a pressure-relief position in which the second engaging portion engages with the second engaged portion and the cover body opens the first main opening.

2. The electromagnetic relay according to claim 1, wherein the case includes a sub-opening disposed between the contact unit and the first main opening.

3. The electromagnetic relay according to claim 2, wherein in a state that the cover is in the normal position, the second engaging portion closes the sub-opening, and in a state that the cover is in the pressure-relief position, the second engaging portion opens the sub-opening.

4. The electromagnetic relay according to claim 1, further comprising a partition wall separating the contact unit from the first main opening.

5. The electromagnetic relay according to claim 1, wherein the side wall includes a long side surface and a short side surface, the first engaged portion is provided on the long side surface, and the second engaged portion is provided on the short side surface.

6. The electromagnetic relay according to claim 5, wherein the cover body includes a long side edge and a short side edge, the first engaging portion is connected to the long side edge, and the second engaging portion is connected to the short side edge.

7. The electromagnetic relay according to claim 5, wherein the short side surface has an uneven shape.

8. The electromagnetic relay according to claim 5, wherein the case includes a first sub-opening provided on the short side surface and disposed between the contact unit and the first main opening, and a second sub-opening provided on the long side surface and disposed between the contact unit and the first main opening.

9. The electromagnetic relay according to claim 1, wherein the cover includes a reinforcing rib connected to the cover body.

10. The electromagnetic relay according to claim 1, wherein the cover includes a gap cover portion disposed to close a gap between the cover body and the case in a state that the cover is in the pressure-relief position.

11. The electromagnetic relay according to claim 1, wherein the cover moves upward relative to the case to move from the normal position to the pressure-relief position.

12. The electromagnetic relay according to claim 1, wherein the cover moves laterally relative to the case to move from the normal position to the pressure-relief position.

13. The electromagnetic relay according to claim 1, wherein the case includes a hinge and the cover is rotatably supported by the hinge.

14. The electromagnetic relay according to claim 1, wherein the case includes a lower case and an upper case disposed above the lower case, the first main opening is provided on an upper surface of the upper case, the upper case includes a second main opening provided on a lower surface of the upper case, and the upper case is held in either a normal position in which the lower case closes the second main opening or a pressure-relief position in which the lower case opens the second main opening.

15. The electromagnetic relay according to claim 1, wherein the case includes a guide that guides air flowing out from a gap between the cover and the case in a state that the cover is in the pressure-relief position.

* * * * *